US012768011B2

(12) United States Patent
Amano et al.

(10) Patent No.: US 12,768,011 B2
(45) Date of Patent: Oct. 20, 2026

(54) BATTERY PACKAGING MATERIAL, BATTERY, METHOD FOR PRODUCING BATTERY PACKAGING MATERIAL, AND ALUMINUM ALLOY FOIL

(71) Applicant: DAI NIPPON PRINTING CO., LTD., Tokyo (JP)

(72) Inventors: Makoto Amano, Tokyo (JP); Atsuko Takahagi, Tokyo (JP); Rikiya Yamashita, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 636 days.

(21) Appl. No.: 15/771,233

(22) PCT Filed: Oct. 28, 2016

(86) PCT No.: PCT/JP2016/082181
§ 371 (c)(1),
(2) Date: Apr. 26, 2018

(87) PCT Pub. No.: WO2017/073774
PCT Pub. Date: May 4, 2017

(65) Prior Publication Data

US 2018/0312943 A1 Nov. 1, 2018

(30) Foreign Application Priority Data

| | | |
|---|---|---|
| Oct. 28, 2015 | (JP) | 2015-211830 |
| Oct. 28, 2015 | (JP) | 2015-211831 |
| Feb. 9, 2016 | (JP) | 2016-022469 |

(51) Int. Cl.
*C22C 21/00* (2006.01)
*H01G 11/78* (2013.01)
(Continued)

(52) U.S. Cl.
CPC .......... *C22C 21/00* (2013.01); *H01M 50/119* (2021.01); *H01M 50/121* (2021.01);
(Continued)

(58) Field of Classification Search
None
See application file for complete search history.

(56) References Cited

U.S. PATENT DOCUMENTS

2002/0150712 A1 10/2002 Ohtaki et al.
2002/0160212 A1 10/2002 Yamashita et al.
(Continued)

FOREIGN PATENT DOCUMENTS

CN 102625818 A 8/2012
EP 2 955 770 A1 12/2015
(Continued)

OTHER PUBLICATIONS

Anderson, Kevin, ASM Handbook vol. 2A, Aluminum Science and Technology, "Wrought Aluminum Processes and Products", pp. 255-278. (Year: 2018).*
(Continued)

*Primary Examiner* — Keith D. Hendricks
*Assistant Examiner* — Janell C Morillo
(74) *Attorney, Agent, or Firm* — Oliff PLC

(57) ABSTRACT

A battery packaging material that is unlikely to develop pinholes or cracks during molding, and has excellent moldability, comprising at least an aluminum alloy foil layer, wherein for any 100 aluminum alloy grains positioned within a field of view of a scanning electron microscope in a cross section of the aluminum alloy foil layer in a thickness direction, an average grain diameter, which is an average value of a maximum diameter x of the 100 grains, is 10.0 μm or less, where the maximum diameter x is defined as a linear distance connecting a leftmost end of each of the grains in
(Continued)

a direction perpendicular to the thickness direction and a rightmost end of the grain in the direction perpendicular to the thickness direction.

16 Claims, 4 Drawing Sheets

(51) Int. Cl.

| | |
|---|---|
| ***H01G 11/84*** | (2013.01) |
| ***H01M 50/119*** | (2021.01) |
| ***H01M 50/121*** | (2021.01) |
| ***H01M 50/124*** | (2021.01) |
| ***H01M 50/126*** | (2021.01) |
| ***H01M 50/131*** | (2021.01) |
| ***H01M 50/133*** | (2021.01) |
| *C22F 1/04* | (2006.01) |

(52) U.S. Cl.

CPC ....... *H01M 50/124* (2021.01); *H01M 50/126* (2021.01); *H01M 50/131* (2021.01); *H01M 50/133* (2021.01); *C22F 1/04* (2013.01); *H01G 11/78* (2013.01); *H01G 11/84* (2013.01)

(56) References Cited

U.S. PATENT DOCUMENTS

| | | | |
|---|---|---|---|
| 2008/0241663 A1 | 10/2008 | Yamashita et al. | |
| 2008/0286635 A1 | 11/2008 | Seino et al. | |
| 2012/0190790 A1 | 7/2012 | Yamaguchi et al. | |
| 2012/0258353 A1 | 10/2012 | Yamashita et al. | |
| 2013/0029140 A1 | 1/2013 | Takao et al. | |
| 2013/0209868 A1 | 8/2013 | Suzuta et al. | |
| 2014/0242333 A1 | 8/2014 | Oono et al. | |
| 2014/0356655 A1 | 12/2014 | Yoshino | |
| 2015/0203941 A1* | 7/2015 | Seki | C22C 21/00 429/176 |
| 2015/0255761 A1 | 9/2015 | Hashimoto et al. | |
| 2015/0372263 A1 | 12/2015 | Douke et al. | |
| 2015/0380692 A1 | 12/2015 | Ojiri et al. | |
| 2016/0172638 A1 | 6/2016 | Amano et al. | |
| 2016/0197318 A1 | 7/2016 | Yamashita et al. | |
| 2016/0301040 A1 | 10/2016 | Takahagi et al. | |
| 2018/0090724 A1 | 3/2018 | Miyazaki et al. | |
| 2018/0312943 A1 | 11/2018 | Amano et al. | |

FOREIGN PATENT DOCUMENTS

| | | | |
|---|---|---|---|
| EP | 3 043 399 | A1 | 7/2016 |
| EP | 3 121 863 | A1 | 1/2017 |
| JP | H03-120332 | A | 5/1991 |
| JP | 2000-223087 | A | 8/2000 |
| JP | 2005-056729 | A | 3/2005 |
| JP | 2006-312266 | A | 11/2006 |
| JP | 2006-312768 | A | 11/2006 |
| JP | 2007-297427 | A | 11/2007 |
| JP | 2008-287971 | A | 11/2008 |
| JP | 2010-244930 | A | 10/2010 |
| JP | 2013-174010 | A | 9/2013 |
| JP | 2013-222545 | A | 10/2013 |
| JP | 2014-065956 | A | 4/2014 |
| JP | 2014-157727 | A | 8/2014 |
| JP | 2014-175121 | A | 9/2014 |
| JP | 2015-008119 | A | 1/2015 |
| JP | 5725224 | B1 | 5/2015 |
| JP | 2015-106528 | A | 6/2015 |
| JP | 2015-203154 | A | 11/2015 |
| JP | 2016-156059 | A | 9/2016 |
| JP | 2016-184591 | A | 10/2016 |
| JP | 2016-186934 | A | 10/2016 |
| JP | 2017-033743 | A | 2/2017 |
| JP | 2017-069203 | A | 4/2017 |
| JP | 2017-084787 | A | 5/2017 |
| JP | 2017-188227 | A | 10/2017 |
| KR | 10-2013-0062901 | A | 6/2013 |
| WO | 2012/036181 | A1 | 3/2012 |
| WO | 2014-021170 | A1 | 2/2014 |
| WO | 2014/050542 | A1 | 4/2014 |
| WO | 2016/159190 | A1 | 10/2016 |
| WO | 2017/131155 | A1 | 8/2017 |

OTHER PUBLICATIONS

Hirsch, Jurgen, ASM Handbook, vol. 4E, Heat treating of Nonferrous Alloys, “Annealing of Aluminum and its Alloys”, pp. 137-147, Jun. 2016. (Year: 2016).*
Cramer, S.D., and B.S Covino, Jr., “ASM Handbook, vol. 13A: Corrosion: Fundamentals, Testing, and Protection”. pp. 720-735. (Year: 2003).*
Jan. 31, 2017 International Search Report issued in International Patent Application No. PCT/JP2016/082181.
Jun. 30, 2020 Office Action issued in Japanese Patent Application No. 2016-212109.
Nov. 9, 2022 Office Action Issued in U.S. Appl. No. 16/650,462.
Oct. 21, 2022 Office Action Issued in U.S. Appl. No. 16/604,895.
Nov. 22, 2022 Office Action Issued in Japanese Patent Application No. 2019-017602.
Nov. 29, 2022 Office Action Issued in Korean Patent Application No. 10-2022-7023290.
Jan. 8, 2019 Search Report issued in International Patent Application No. PCT/JP2018/036586.
Jul. 24, 2018 International Search Report issued in International Patent Application No. PCT/JP2018/016359.
Dec. 22, 2020 Extended European Search Report issued in European Patent Application No. 18787250.2.
Feb. 4, 2021 Office Action issued in Korean Patent Application No. 10-2019-7027134.
Mar. 26, 2021 Office Action issued in U.S. Appl. No. 16/604,895.
U.S. Appl. No. 16/604,895, filed Oct. 11, 2019 in the name of Yasuda et al.
Bing Lu and T. C. Chung, “New Maleic Anhydride Modified PP Copolymers with Block Structure: Synthesis and Application in PP/Polyamide Reactive Blends”, Department of Materials Science and Engineering, The Pennsylvania State University; Macromolecules vol. 32, No. 8, 1999, pp. 2525-2533 (Year: 1999).
Feb. 23, 2022 Office Action issued in U.S. Appl. No. 16/604,895.
Jan. 26, 2022 Office Action issued in Chinese Patent Application No. 201880060442.1.
Jun. 28, 2022 Office Action issued In U.S. Appl. No. 16/650,462.
Aug. 3, 2022 Office Action issued in U.S. Appl. No. 16/650,462.
U.S. Appl. No. 16/650,462, filed Mar. 25, 2020 in the name of Yamashita et al.
Apr. 5, 2023 Office Action issued in U.S. Appl. No. 16/604,895.
May 17, 2023 Office Action issued in U.S. Appl. No. 16/650,462.
Sep. 8, 2023 Office Action issued in U.S. Appl. No. 16/650,462.
Sep. 11, 2024 Office Action issued in U.S. Appl. No. 16/650,462.
May 21, 2025 Office Action issued in U.S. Appl. No. 16/650,462.
Jun. 4, 2024 Office Action issued in U.S. Appl. No. 16/650,462.
Dec. 18, 2025 Office Action issued in U.S. Appl. No. 18/230,894.
Guo et al., “Influence of lithium hexafluorophosphate/ethylene carbonate/dimethyl carbonate electrolyte soaking on heat seal strength of polyamide 6/aluminum/cast-polypropylene laminates used as lithium-ion battery packaging”, J of Plastic Film & Sheeting , pp. 1-17, DOI: 10.1177/8756087916686141 (Year: 2016).
U.S. Appl. No. 18/230,894, filed Aug. 7, 2023 in the name Yasuda et al.
Apr. 27, 2026 Office Action issued in U.S. Appl. No. 18/230,894.
Palmetto Industries, “Polypropylene Melting Point & PP Softening Temperature Explained”, <https://www.palmetto-industries.com/polypropylene-melting-point/> (Year: 2025).
Alexandridis et al., “Polypropylene Dissolution Kinetics: Effects of Solvent, Temperature, and Particle Size.” Polymers, 17, 3213. https://doi.org/10.3390/polym17233213 (Year: 2025).

* cited by examiner

BATTERY PACKAGING MATERIAL, BATTERY, METHOD FOR PRODUCING BATTERY PACKAGING MATERIAL, AND ALUMINUM ALLOY FOIL

TECHNICAL FIELD

The present invention relates to a battery packaging material, a battery, a method for producing a battery packaging material, and aluminum alloy foil.

BACKGROUND ART

Various types of batteries have been heretofore developed, and in every battery, a packaging material is an essential member for sealing battery elements such as an electrode and an electrolyte. Metallic packaging materials have been heretofore widely used as battery packaging materials.

In recent years, batteries have been required to be diversified in shape, and to be thinner and lighter weight, along with improvements in the performance of electric cars, hybrid electric cars, personal computers, cameras, mobile phones, and the like. However, the widely used metallic battery packaging materials are disadvantageous in that they have difficulty in keeping up with the diversification of shapes, and are limited in weight reduction.

Thus, a film-shaped laminate in which a base material/an aluminum alloy foil layer/a heat-sealable resin layer are laminated in this order has been recently proposed as a battery packaging material that can be readily processed into various shapes, and can achieve a thickness reduction and a weight reduction.

In such a battery packaging material, typically, a concave portion is formed by cold forming, battery elements such as an electrode and an electrolytic solution are disposed in the space formed by the concave portion, and the heat-sealable resin layer is heat-sealed with itself. As a result, a battery whose battery elements are housed inside the battery packaging material is obtained. However, such a film-shaped packaging material is disadvantageous in that it is thinner than metallic packaging materials, and is likely to develop pinholes or cracks during molding. If pinholes or cracks develop in the battery packaging material, the electrolytic solution may penetrate into the aluminum alloy foil layer to form a metal deposit, possibly resulting in the occurrence of a short circuit. Thus, it is essential for the film-shaped packaging material to have the property of being unlikely to develop pinholes during molding, i.e., excellent moldability.

For example, Patent Literature 1 discloses that a packaging material with high reliability for deeper molding is obtained using a laminated-type packaging material comprising an inner layer composed of a resin film, a first adhesive agent layer, an aluminum alloy foil layer, a second adhesive agent layer, and a resin film, wherein at least one of the first adhesive agent layer and the second adhesive agent layer is formed of an adhesive composition containing a resin having an active hydrogen group in a side chain, a polyfunctional isocyanate, and a polyfunctional amine compound.

CITATION LIST

Patent Literature

Patent Literature 1: JP 2008-287971 A

SUMMARY OF INVENTION

Technical Problem

Along with the recent demand for smaller and thinner batteries, battery packaging materials are also required to be even thinner. Along with this, the aluminum alloy foil layer laminated in a battery packaging material is required to have an even smaller thickness. However, as the thickness of the aluminum alloy foil layer becomes smaller, the aluminum alloy foil layer becomes more likely to develop pinholes or cracks during molding.

Under such circumstances, a main object of the present invention is to provide a battery packaging material in which the development of pinholes or cracks in the aluminum alloy foil layer can be effectively reduced during molding of the battery packaging material.

Solution to Problem

The inventors of the present invention conducted extensive research to solve the aforementioned problem. As a result, they found that in a battery packaging material comprising at least an aluminum alloy foil layer, when an aluminum alloy foil layer is used in which, for any 100 aluminum alloy grains positioned within a field of view of a scanning electron microscope in a cross section of the aluminum alloy foil layer in a thickness direction, an "average grain diameter", which is an average value of a maximum diameter x of the 100 grains, is 10.0 μm or less, where the maximum diameter x is defined as a linear distance connecting a leftmost end of each of the grains in a direction perpendicular to the thickness direction and a rightmost end of the grain in the direction perpendicular to the thickness direction, the resulting battery packaging material is unlikely to develop pinholes or cracks during molding, and has excellent moldability.

The inventors of the present invention also found that in a battery packaging material comprising at least an aluminum alloy foil layer, when an aluminum alloy foil layer is used in which, for any 100 second phase particles within a field of view of an optical microscope in a cross section of the aluminum alloy foil layer in a thickness direction, an average value of a diameter y of top 20 second phase particles in decreasing order of the diameter y is 5.0 μm or less, where the diameter y is defined as a distance connecting a leftmost end of each of the second phase particles and a rightmost end of the second phase particle, the resulting battery packaging material is unlikely to develop pinholes or cracks during molding, and has excellent moldability.

The inventors of the present invention also found that a battery packaging material comprising a laminate having at least a base material layer, an aluminum alloy foil layer, and a heat-sealable resin layer in this order, wherein aluminum alloy foil constituting the aluminum alloy foil layer has a load-to-displacement relationship that satisfies the following conditions (1) and (2) when subjected to a tensile test under the following test conditions, in accordance with the conditions as defined in JIS Z2241: 2011, is unlikely to develop pinholes or cracks during molding, and has excellent moldability:

condition (1): a load required for displacement to reach 15 mm from 0 mm is 15.0 N or more; and condition (2): displacement at which a rupture occurs is 15 mm or more;

(Test Conditions)

a thickness of a specimen is 15 μm, a width of the specimen is 15 mm, a distance between chucks is 100 mm, and a tensile speed is 20 mm/min, wherein a tensile direction is a 45° direction with respect to a rolling direction of the aluminum alloy foil as a reference direction (0°).

The present invention was completed as a result of further research based on these findings.

In summary, the present invention provides battery packaging materials and batteries of the following aspects:

Item 1. A battery packaging material comprising at least an aluminum alloy foil layer, wherein for any 100 aluminum alloy grains positioned within a field of view of a scanning electron microscope in a cross section of the aluminum alloy foil layer in a thickness direction, an average grain diameter, which is an average value of a maximum diameter x of the 100 grains, is 10.0 μm or less, where the maximum diameter x is defined as a linear distance connecting a leftmost end of each of the grains in a direction perpendicular to the thickness direction and a rightmost end of the grain in the direction perpendicular to the thickness direction.

Item 2. The battery packaging material according to item 1, wherein for any 100 second phase particles within a field of view of an optical microscope in a cross section of the aluminum alloy foil layer in the thickness direction, an average value of a diameter y of top 20 second phase particles in decreasing order of the diameter y is 5.0 μm or less, where the diameter y is defined as a linear distance connecting a leftmost end of each of the second phase particles in the direction perpendicular to the thickness direction and a rightmost end of the second phase particle in the direction perpendicular to the thickness direction.

Item 3. A battery packaging material comprising at least an aluminum alloy foil layer, wherein for any 100 second phase particles within a field of view of an optical microscope in a cross section of the aluminum alloy foil layer in a thickness direction, an average value of a diameter y of top 20 second phase particles in decreasing order of the diameter y is 5.0 μm or less, where the diameter y is defined as a linear distance connecting a leftmost end of each of the second phase particles in a direction perpendicular to the thickness direction and a rightmost end of the second phase particle in the direction perpendicular to the thickness direction.

Item 4. The battery packaging material according to item 3, wherein for any 100 aluminum alloy grains positioned within a field of view of a scanning electron microscope in a cross section of the aluminum alloy foil layer in the thickness direction, an average grain diameter, which is an average value of a maximum diameter x of the 100 grains, is 10.0 μm or less, where the maximum diameter x is defined as a linear distance connecting a leftmost end of each of the grains in the direction perpendicular to the thickness direction and a rightmost end of the grain in the direction perpendicular to the thickness direction.

Item 5. A battery packaging material comprising:

a laminate having at least a base material layer, an aluminum alloy foil layer, and a heat-sealable resin layer in this order, wherein aluminum alloy foil constituting the aluminum alloy foil layer has a load-to-displacement relationship that satisfies the following conditions (1) and (2) when subjected to a tensile test under the following test conditions, in accordance with the conditions as defined in JIS Z2241: 2011:

condition (1): a load required for displacement to reach 15 mm from 0 mm is 15.0 N or more; and condition (2): displacement at which a rupture occurs is 15 mm or more;

(Test Conditions)

a thickness of a specimen is 15 μm, a width of the specimen is 15 mm, a distance between chucks is 100 mm, and a tensile speed is 20 mm/min, wherein a tensile direction is a 45° direction with respect to a rolling direction of the aluminum alloy foil as a reference direction (0°).

Item 6. The battery packaging material according to item 5, wherein the load-to-displacement relationship of the aluminum alloy foil constituting the aluminum alloy foil layer further satisfies the following condition (3):

condition (3): an increase in the load until displacement reaches 5 mm from 1 mm is 3.0 N or less.

Item 7. The battery packaging material according to any one of items 1 to 6, wherein an aluminum alloy constituting the aluminum alloy foil layer comprises 0.7 mass % or more and 2.5 mass % or less of Fe, 0.05 mass % or less of Cu, and 0.30 mass % or less of Si.

Item 8. The battery packaging material according to any one of items 1 to 7, wherein the aluminum alloy foil layer comprises an acid resistance film on at least one surface thereof.

Item 9. The battery packaging material according to any one of items 1 to 8, which is a packaging material for secondary batteries.

Item 10. A battery comprising a battery element comprising at least a positive electrode, a negative electrode, and an electrolyte, the battery element being housed in a container formed of the battery packaging material according to any one of items 1 to 9.

Item 11. A method for producing a battery packaging material comprising the step of:

laminating at least a base material layer, an aluminum alloy foil layer, and a heat-sealable resin layer in this order to provide a laminate, wherein as the aluminum alloy foil layer, an aluminum alloy foil layer is used in which, for any 100 aluminum alloy grains positioned within a field of view of a scanning electron microscope in a cross section of the aluminum alloy foil layer in a thickness direction, an average grain diameter, which is an average value of a maximum diameter x of the 100 grains, is 10.0 μm or less, where the maximum diameter x is defined as a linear distance connecting a leftmost end of each of the grains in a direction perpendicular to the thickness direction and a rightmost end of the grain in the direction perpendicular to the thickness direction.

Item 12. A method for producing a battery packaging material comprising the step of:

laminating at least a base material layer, an aluminum alloy foil layer, and a heat-sealable resin layer in this order to provide a laminate, wherein as the aluminum alloy foil layer, an aluminum alloy foil layer is used in which, for any 100 second phase particles within a field of view of an optical microscope in a cross section of the aluminum alloy foil layer in a thickness direction, an average value of a diameter y of top 20 second phase particles in decreasing order of the diameter y is 5.0 μm or less, where the diameter y is defined as a linear distance connecting a leftmost end of each of the second phase particles in a direction perpendicular to the thickness direction and a rightmost end of the second phase particle in the direction perpendicular to the thickness direction.

Item 13. A method for producing a battery packaging material comprising the step of:

laminating at least a base material layer, an aluminum alloy foil layer, and a heat-sealable resin layer in this order to provide a laminate, wherein aluminum alloy foil constituting the aluminum alloy foil layer has a load-to-displacement relationship that satisfies the following conditions (1) and (2) when subjected to a tensile test under the following test conditions, in accordance with the conditions as defined in JIS Z2241: 2011:

condition (1): a load required for displacement to reach 15 mm from 0 mm is 15.0 N or more; and condition (2): displacement at which a rupture occurs is 15 mm or more;

(Test Conditions)

a thickness of a specimen is 15 μm, a width of the specimen is 15 mm, a distance between chucks is 100 mm, and a tensile speed is 20 mm/min, wherein a tensile direction is a 45° direction with respect to a rolling direction of the aluminum alloy foil as a reference direction (0°).

Item 14. Aluminum alloy foil for use in a battery packaging material, wherein for any 100 aluminum alloy grains positioned within a field of view of a scanning electron microscope in a cross section of the aluminum alloy foil in a thickness direction, an average grain diameter, which is an average value of a maximum diameter x of the 100 grains, is 10.0 μm or less, where the maximum diameter x is defined as a linear distance connecting a leftmost end of each of the grains in a direction perpendicular to the thickness direction and a rightmost end of the grain in the direction perpendicular to the thickness direction.

Item 15. The aluminum alloy foil for use in a battery packaging material according to claim 14, wherein for any 100 second phase particles within a field of view of an optical microscope in a cross section of the aluminum alloy foil in the thickness direction, an average value of a diameter y of top 20 second phase particles in decreasing order of the diameter y is 5.0 μm or less, where the diameter y is defined as a linear distance connecting a leftmost end of each of the second phase particles in the direction perpendicular to the thickness direction and a rightmost end of the second phase particle in the direction perpendicular to the thickness direction.

Item 16. Aluminum alloy foil for use in a battery packaging material, wherein for any 100 second phase particles within a field of view of an optical microscope in a cross section of the aluminum alloy foil in a thickness direction, an average value of a diameter y of top 20 second phase particles in decreasing order of the diameter y is 5.0 μm or less, where the diameter y is defined as a linear distance connecting a leftmost end of each of the second phase particles in a direction perpendicular to the thickness direction and a rightmost end of the second phase particle in the direction perpendicular to the thickness direction.

Item 17. The aluminum alloy foil for use in a battery packaging material according to item 16, wherein for any 100 aluminum alloy grains positioned within a field of view of a scanning electron microscope in a cross section of the aluminum alloy foil in the thickness direction, an average grain diameter, which is an average value of a maximum diameter x of the 100 grains, is 10.0 μm or less, where the maximum diameter x is defined as a linear distance connecting a leftmost end of each of the grains in the direction perpendicular to the thickness direction and a rightmost end of the grain in the direction perpendicular to the thickness direction.

Item 18. Aluminum alloy foil for use in a battery packaging material, which has a load-to-displacement relationship that satisfies the following conditions (1) and (2) when subjected to a tensile test under the following test conditions:

condition (1): a load required for displacement to reach 15 mm from 0 mm is 15.0 N or more; and condition (2): displacement at which a rupture occurs is 15 mm or more;

(Test Conditions)

a thickness of a specimen is 15 μm, a width of the specimen is 15 mm, a distance between chucks is 100 mm, and a tensile speed is 20 mm/min, wherein a tensile direction is a 45° direction with respect to a rolling direction of the aluminum alloy foil as a reference direction (0°).

Item 19. The aluminum alloy foil for use in a battery packaging material according to item 18, which has a thickness of 30 μm or less.

Item 20. The aluminum alloy foil for use in a battery packaging material according to any one of items 16 to 19, wherein an aluminum alloy constituting the aluminum alloy foil comprises 0.7 mass % or more and 2.5 mass % or less of Fe, 0.05 mass % or less of Cu, and 0.30 mass % or less of Si.

Item 21. The aluminum alloy foil for use in a battery packaging material according to any one of items 16 to 20, which comprises an acid resistance film on at least one surface thereof.

Advantageous Effects of Invention

According to the present invention, a battery packaging material can be provided that is unlikely to develop pinholes or cracks during molding, and has excellent moldability. Since the battery packaging material of the present invention has excellent moldability, it can also contribute to an improvement in productivity.

DESCRIPTION OF EMBODIMENTS

Figure 1:
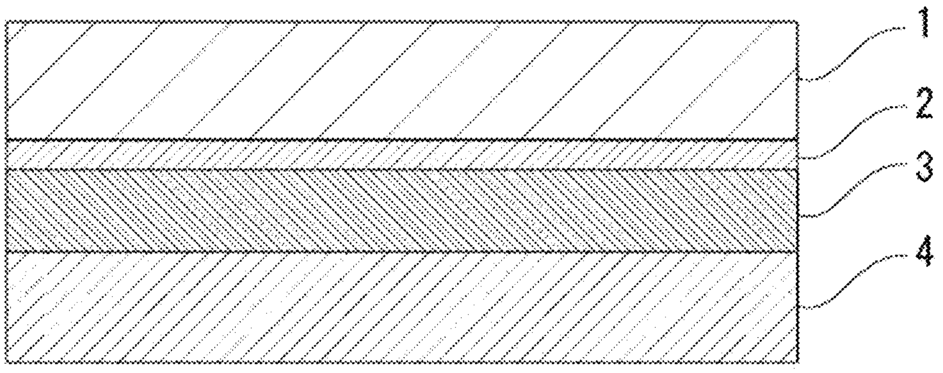
FIG. 1 is a diagram showing one example of a cross-sectional structure of a battery packaging material of the present invention.

A battery packaging material according to a first aspect of the present invention comprises at least an aluminum alloy foil layer, wherein, for any 100 aluminum alloy grains positioned within a field of view of a scanning electron microscope in a cross section of the aluminum alloy foil layer in a thickness direction, an average grain diameter, which is an average value of a maximum diameter x of the 100 grains, is 10.0 μm or less, where the maximum diameter x is defined as a linear distance connecting a leftmost end of each of the grains in a direction perpendicular to the thickness direction and a rightmost end of the grain in the direction perpendicular to the thickness direction.

A battery packaging material according to a second aspect of the present invention comprises at least an aluminum alloy foil layer, wherein, for any 100 second phase particles within a field of view of an optical microscope in a cross section of the aluminum alloy foil layer in a thickness direction, an average value of a diameter y of top 20 second phase particles in decreasing order of the diameter y is 5.0 μm or less, where the diameter y is defined as a linear distance connecting a leftmost end of each of the second phase particles in a direction perpendicular to the thickness direction and a rightmost end of the second phase particle in the direction perpendicular to the thickness direction.

A battery packaging material according to a third aspect of the present invention comprises a laminate having at least a base material layer, an aluminum alloy foil layer, and a heat-sealable resin layer in this order, wherein aluminum alloy foil constituting the aluminum alloy foil layer has a load-to-displacement relationship that satisfies the following conditions (1) and (2) when subjected to a tensile test under the following test conditions, in accordance with the conditions as defined in JIS Z2241: 2011:

condition (1): a load required for displacement to reach 15 mm from 0 mm is 15.0 N or more; and condition (2): displacement at which a rupture occurs is 15 mm or more;

(Test Conditions)

a thickness of a specimen is 15 μm, a width of the specimen is 15 mm, a distance between chucks is 100 mm, and a tensile speed is 20 mm/min, wherein a tensile direction is a 45° direction with respect to a rolling direction of the aluminum alloy foil as a reference direction (0°).

The battery packaging material of the present invention will be hereinafter described in detail. In the present specification, any numerical range indicated by " . . . to . . . " is intended to mean " . . . or more" and " . . . or less", unless it is explicitly stated that the numerical range is " . . . or more" or " . . . or less". For example, the recitation "2 to 15 mm" is intended to mean 2 mm or more and 15 mm or less. Furthermore, the present specification describes the common features among the first to third aspects of the present invention as the present invention, without explicitly stating that these features concern these aspects.

1. Laminated Structure of Battery Packaging Material

The battery packaging material of the present invention comprises at least an aluminum alloy foil layer 3, as shown in FIG. 1. The battery packaging material of the present invention may be, for example, a laminate having a base material layer 1, the aluminum alloy foil layer 3, and a heat-sealable resin layer 4 in this order, as shown in FIG. 1. When the battery packaging material of the present invention is such a laminate, the base material layer 1 is an outermost layer, and the heat-sealable resin layer 4 is an innermost layer. That is, during the assembly of a battery, the heat-sealable resin layer 4 positioned on the periphery of a battery element is heat-sealed with itself to hermetically seal the battery element, such that the battery element is encapsulated.

Figure 2:
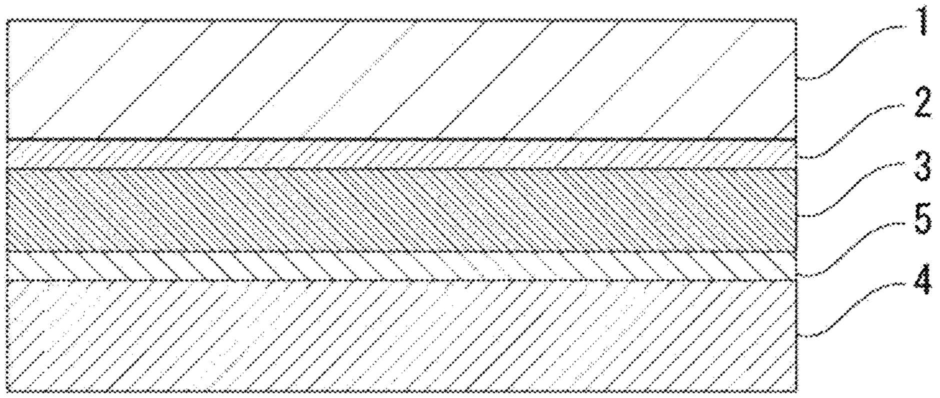
FIG. 2 is a diagram showing one example of a cross-sectional structure of a battery packaging material of the present invention.

As shown in FIG. 1, the battery packaging material of the present invention may optionally include an adhesive agent layer 2 between the base material layer 1 and the aluminum alloy foil layer 3, in order to improve the adhesion between these layers. Furthermore, as shown in FIG. 2, the battery packaging material of the present invention may also optionally include an adhesive layer 5 between the aluminum alloy foil layer 3 and the heat-sealable resin layer 4, in order to improve the adhesion between these layers.

While the total thickness of the battery packaging material of the present invention is not particularly limited, it is, for example, 200 μm or less, preferably 180 μm or less, more preferably about 40 to 155 μm, and still more preferably about 40 to 90 μm, from the viewpoint of obtaining a battery packaging material having excellent moldability, while reducing the thickness of the battery packaging material and increasing the energy density of the battery.

2. Layers that Form Battery Packaging Material

[Base Material Layer 1]

In the battery packaging material of the present invention, the base material layer 1 is a layer that is optionally provided, and positioned as an outermost layer. The material that forms the base material layer 1 is not particularly limited so long as it has insulation properties. Examples of materials that form the base material layer 1 include polyesters, polyamides, epoxy resins, acrylic resins, fluororesins, polyurethanes, silicone resins, phenol resins, polyether imides, polyimides, and mixtures or copolymers thereof.

Specific examples of polyesters include polyethylene terephthalate, polybutylene terephthalate, polyethylene naphthalate, polybutylene naphthalate, polyethylene isophthalate, polycarbonate, copolyesters containing ethylene terephthalate as a main repeating unit, and copolyesters containing butylene terephthalate as a main repeating unit. Specific examples of copolyesters containing ethylene terephthalate as a main repeating unit include copolyesters obtained by polymerizing ethylene isophthalate with ethylene terephthalate as a main repeating unit (abbreviated as polyethylene (terephthalate/isophthalate); hereinafter abbreviations are made in the same manner), polyethylene (terephthalate/isophthalate), polyethylene (terephthalate/adipate), polyethylene (terephthalate/sodium sulfoisophthalate), polyethylene (terephthalate/sodium isophthalate), polyethylene (terephthalate/phenyl-dicarboxylate), and polyethylene (terephthalate/decane dicarboxylate). Specific examples of copolyesters containing butylene terephthalate as a main repeating unit include copolyesters obtained by polymerizing butylene isophthalate with butylene terephthalate as a main repeating unit (abbreviated as polybutylene (terephthalate/isophthalate); hereinafter abbreviations are made in the same manner), polybutylene (terephthalate/adipate), polybutylene (terephthalate/sebacate), polybutylene (terephthalate/decane dicarboxylate), and polybutylene naphthalate. These polyesters may be used alone, or in combination of two or more. Polyesters are suitably used as the material that forms the base material layer 1, because they have the advantage of having excellent electrolytic solution resistance, and being unlikely to cause whitening or the like due to deposition of the electrolytic solution.

Specific examples of polyamides include aliphatic polyamides such as nylon 6, nylon 66, nylon 610, nylon 12, nylon 46, and copolymers of nylon 6 and nylon 66; polyamides containing aromatics such as hexamethylenediamine-isophthalic acid-terephthalic acid copolyamides containing a structural unit derived from terephthalic acid and/or isophthalic acid, such as nylon 6I, nylon 6T, nylon 6IT, and nylon 6I6T (I denotes isophthalic acid, and T denotes terephthalic acid), and polymethaxylylene adipamide (MXD6); cycloaliphatic polyamides such as polyaminomethyl cyclohexyl adipamide (PACM 6); polyamides copolymerized with a lactam component or an isocyanate component such as 4,4'-diphenylmethane-diisocyanate, and polyester amide copolymers or polyether ester amide copolymers that are copolymers of copolyamides and polyesters or polyalkylene ether glycol; and copolymers thereof. These polyamides may be used alone, or in combination of two or more. Stretched polyamide films are suitably used as the material that forms the base material layer 1, because they have excellent stretchability, and can prevent the occurrence of whitening due to resin breakage in the base material layer 1 during molding.

The base material layer 1 may be formed of a uniaxially or biaxially stretched resin film, or may be formed of an unstretched resin film. Among the above, a uniaxially or biaxially stretched resin film, particularly a biaxially stretched resin film, is suitably used as the base material layer 1, because it has improved heat resistance through oriented crystallization. The base material layer 1 may be formed by coating the aluminum alloy foil layer 3 with the above-described material.

Among the above, nylons and polyesters are preferred, biaxially stretched nylons and biaxially stretched polyesters are more preferred, and biaxially stretched nylons are particularly preferred, as the resin film that forms the base material layer 1.

The base material layer 1 can also be laminated with at least one of a resin film and a coating made of a different material, in order to improve the pinhole resistance, and the insulation properties when used as a packaging material for a battery. Specific examples include a multilayer structure in which a polyester film and a nylon film are laminated, and a multilayer structure in which a biaxially stretched polyester and a biaxially stretched nylon are laminated. When the base material layer 1 has a multilayer structure, the resin films may be bonded with an adhesive, or may be directly laminated without an adhesive. Examples of methods for bonding the resin films without an adhesive include methods in which the resin films are bonded in a heat-melted state, such as a co-extrusion lamination method, a sandwich lamination method, and a thermal lamination method. When the resin films are bonded with an adhesive, the adhesive to be used may be a two-liquid curable adhesive or a one-liquid curable adhesive. Furthermore, the adhesion mechanism of the adhesive is not particularly limited, and may be any of a chemical reaction type, a solvent volatilization type, a heat melting type, a heat pressing type, an EB curing type, a UV curing type, and the like. Examples of components that form the adhesive include polyester-based resins, polyether-based resins, polyurethane-based resins, epoxy-based resins, phenol resin-based resins, polyamide-based resins, polyolefin-based resins, polyvinyl acetate-based resins, cellulose-based resins, (meth)acrylic-based resins, polyimide-based resins, amino resins, rubbers, and silicone-based resins.

The thickness of the base material layer 1 is preferably 25 μm or less, and more preferably about 8 to 25 μm.

[Adhesive Agent Layer 2]

In the battery packaging material of the present invention, the adhesive agent layer 2 is a layer that is optionally provided between the base material layer 1 and the aluminum alloy foil layer 3, in order to strongly bond these layers.

The adhesive agent layer 2 is formed of an adhesive capable of bonding the base material layer 1 and the aluminum alloy foil layer 3. The adhesive to be used for forming the adhesive agent layer 2 may be a two-liquid curable adhesive or a one-liquid curable adhesive. Furthermore, the adhesion mechanism of the adhesive used for forming the adhesive agent layer 2 is not particularly limited, and may be any of a chemical reaction type, a solvent volatilization type, a heat melting type, a heat pressing type, and the like.

Specific examples of adhesive components usable for forming the adhesive agent layer 2 include polyester-based resins such as polyethylene terephthalate, polybutylene terephthalate, polyethylene naphthalate, polybutylene naphthalate, polyethylene isophthalate, polycarbonate, and copolyesters; polyether-based adhesives; polyurethane-based adhesives; epoxy-based resins; phenol resin-based resins; polyamide-based resins such as nylon 6, nylon 66, nylon 12, and copolyamides; polyolefin-based resins such as polyolefins, carboxylic acid-modified polyolefins, and metal-modified polyolefins; polyvinyl acetate-based resins; cellulose-based adhesives; (meth)acrylic-based resins; polyimide-based resins; amino resins such as urea resins and melamine resins; rubbers such as chloroprene rubber, nitrile rubber, and styrene-butadiene rubber; and silicone-based resins. These adhesive components may be used alone, or in combination of two or more. Among these adhesive components, polyurethane-based adhesives are preferred.

The thickness of the adhesive agent layer 2 is not particularly limited so long as the battery packaging material satisfies the above-described physical properties, while the adhesive agent layer 2 exhibits the function as an adhesive layer; for example, the thickness is about 1 to 10 μm, and preferably about 2 to 5 μm.

[Aluminum Alloy Foil Layer 3]

In the battery packaging material, the aluminum alloy foil layer 3 is a layer that serves to improve the strength of the battery packaging material, and serves as a barrier layer for preventing the ingress of water vapor, oxygen, light, and the like into the battery.

As described above, along with the recent demand for smaller and thinner batteries, battery packaging materials are also required to be even thinner. Along with this, the aluminum alloy foil layer laminated in a battery packaging material is also required to have an even smaller thickness. In the present invention, the thickness of the entire battery packaging material can be reduced to the above-described thickness. Thus, the energy density of the battery can be effectively increased.

In the present invention, the thickness of the aluminum alloy foil layer is preferably 100 μm or less, more preferably 80 μm or less, still more preferably 50 μm or less, even more preferably 35 μm or less, still more preferably 30 μm or less, even more preferably about 15 to 30 μm, still more preferably about 15 to 25 μm, and particularly preferably about 15 to 20 μm, from the viewpoint of obtaining a battery packaging material having excellent moldability and having an excellent appearance after molding, while even further reducing the thickness of the battery packaging material and increasing the energy density of the battery.

As described above, it has been revealed that when the thickness of the aluminum alloy foil layer is reduced to, for example, about 100 μm, and even about 30 μm, the aluminum alloy foil layer is particularly likely to develop pinholes or cracks during the molding of the battery packaging material. As a result of further research conducted by the inventors of the present invention, it has been revealed that when the thickness of the aluminum alloy foil layer is reduced to, for example, about 100 μm, and even about 30 μm, and the total thickness of the battery packaging material is reduced to, for example, the above-described thickness, then, the frequency of occurrence of pinholes or cracks during molding is significantly increased.

In contrast, in the battery packaging material according to the first aspect of the present invention, because the above-described average grain diameter in the aluminum alloy foil layer 3 is 10.0 μm or less, the battery packaging material is unlikely to develop pinholes or cracks during molding, and has excellent moldability. Furthermore, in the battery packaging material according to the first aspect, because the average grain diameter in the aluminum alloy foil layer 3 is 10.0 μm or less, the battery packaging material is unlikely to develop pinholes or cracks during molding, and has excellent moldability, even if the thickness of the aluminum alloy foil layer 3 is, for example, 100 μm or less, and even 30 μm or less, and the total thickness of the battery packaging material is reduced to, for example, the above-described thickness.

In the first aspect, the average grain diameter in the aluminum alloy foil layer 3 may be 10.0 μm or less; however, from the viewpoint of further improving the moldability, the average grain diameter is preferably about 1.0 to 7.0 μm, and more preferably about 1.0 to 3.2 μm.

Figure 3:
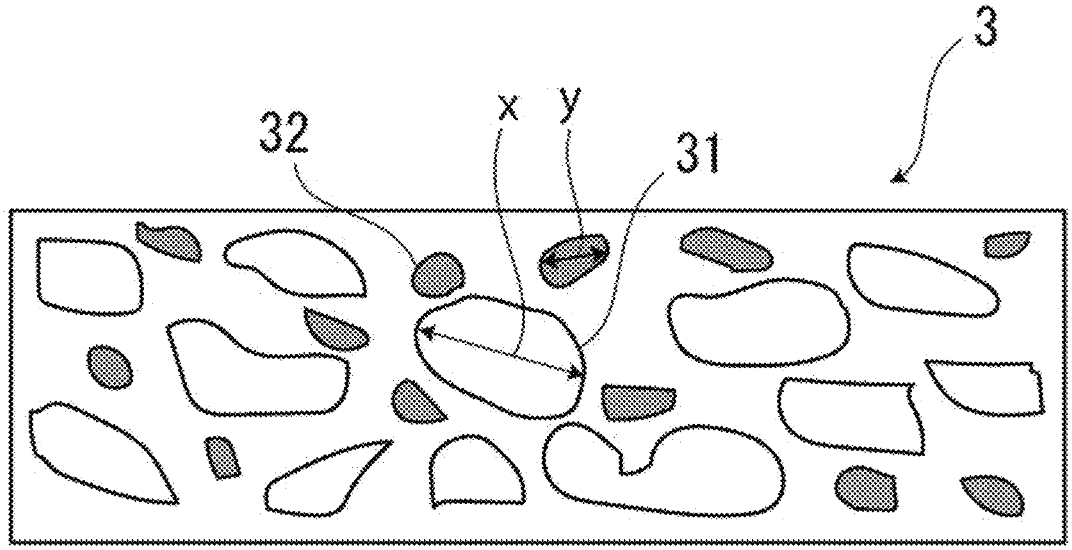
FIG. 3 is a schematic diagram showing grains and second phase particles in a cross section of the aluminum alloy foil layer in a thickness direction.
Figure 4:
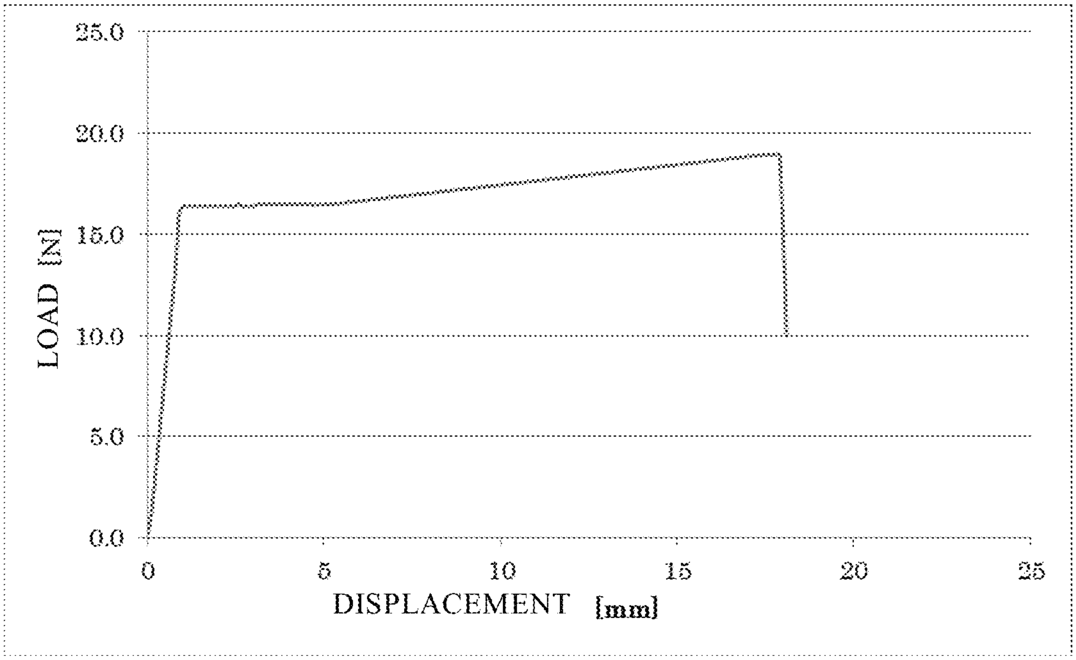
FIG. 4 is a graph showing the load-to-displacement relationship of the aluminum alloy foil used in Example 9C when it was subjected to a tensile test in a 45° direction with respect to the rolling direction as a reference direction (0°), in accordance with the conditions as defined in JIS Z 2241.
Figure 5:
FIG. 5 is a graph showing the load-to-displacement relationship of the aluminum alloy foil used in Example 10C when it was subjected to a tensile test in a 45° direction with respect to the rolling direction as a reference direction (0°), in accordance with the conditions as defined in JIS Z 2241.
Figure 6:
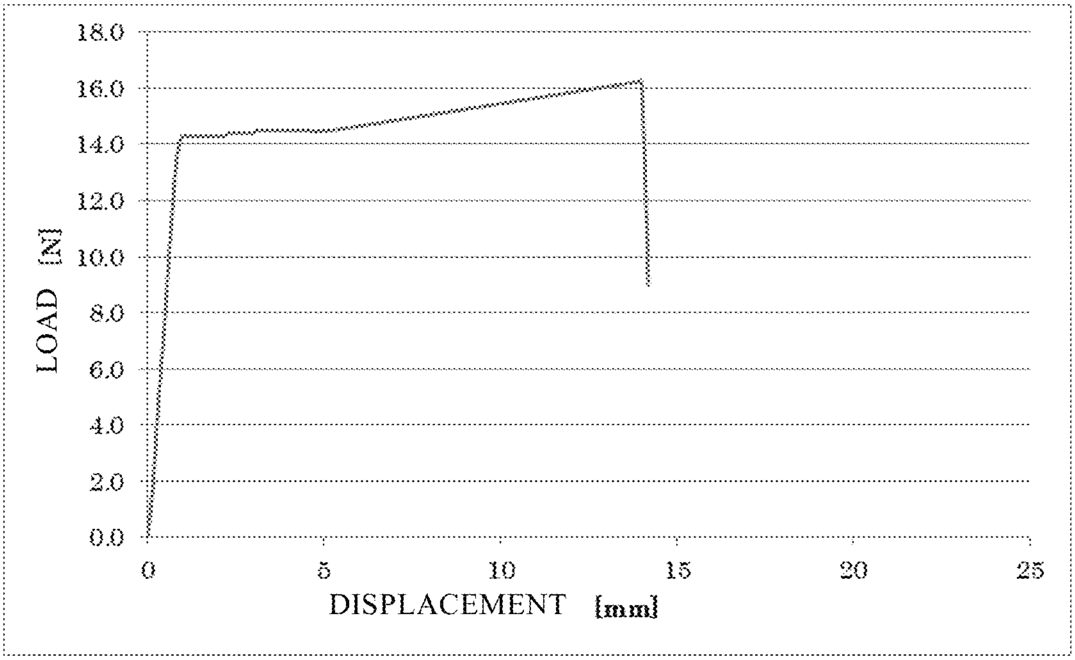
FIG. 6 is a graph showing the load-to-displacement relationship of the aluminum alloy foil used in Comparative Example 1C when it was subjected to a tensile test in a 45° direction with respect to the rolling direction as a reference direction (0°), in accordance with the conditions as defined in JIS Z 2241.
Figure 7:
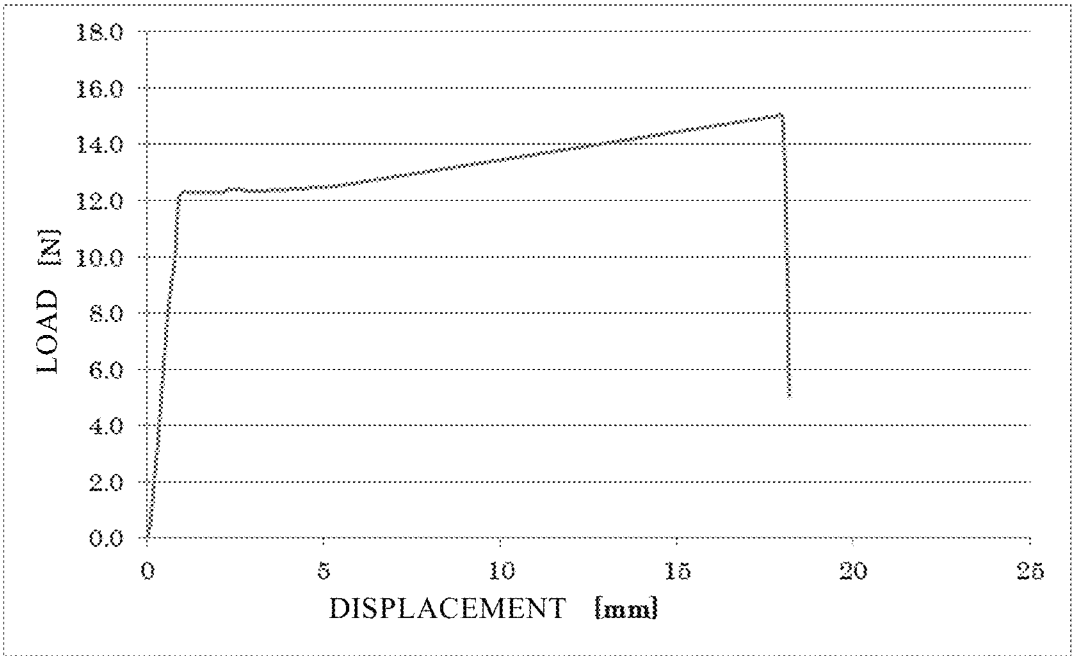
FIG. 7 is a graph showing the load-to-displacement relationship of the aluminum alloy foil used in Comparative Example 3C when it was subjected to a tensile test in a 45° direction with respect to the rolling direction as a reference direction (0°), in accordance with the conditions as defined in JIS Z 2241.

In the present invention, the average grain diameter in the aluminum alloy foil layer is intended to mean the following value: when a cross section of the aluminum alloy foil layer in the thickness direction is observed with a scanning electron microscope (SEM), for any 100 aluminum alloy grains 31 positioned within a field of view, an average value of a maximum diameter x of the 100 grains, where the maximum diameter x is defined as a linear distance connecting the leftmost end of each of the grains in a direction perpendicular to the thickness direction and the rightmost end of the grain in the direction perpendicular to the thickness direction. Since FIG. 3 is a schematic diagram, the illustration of 100 grains 31 is omitted.

Furthermore, in the first aspect, for any 100 second phase particles 32 within a field of view of an optical microscope in a cross section of the laminate constituting the battery packaging material in the thickness direction, an average value of a diameter y of top 20 second phase particles in decreasing order of the diameter y is preferably 5.0 μm or less, where the diameter y is defined as a linear distance connecting the leftmost end of each of the second phase particles in the direction perpendicular to the thickness direction and the rightmost end of the second phase particle in the direction perpendicular to the thickness direction; the average diameter is more preferably 1.0 to 4.0 μm, and still more preferably 1.0 to 2.0 μm. When the average grain diameter in the aluminum alloy foil layer 3 is 10.0 μm or less, and the above-described diameter of the second phase particles 32 is within this range, the moldability of the battery packaging material can be even further improved. Since FIG. 3 is a schematic diagram, the illustration of 100 second phase particles 32 is omitted.

In the present invention, the second phase particles contained in the aluminum alloy layer refers to intermetallic compound particles present in the aluminum alloy, which are crystallization-phase particles that are separated by rolling or deposition-phase particles that are deposited during a homogenization treatment or annealing.

When a cross section of the aluminum alloy foil layer in the thickness direction is observed with a scanning electron microscope (SEM), the grains typically form boundaries that contact a plurality of crystals. On the other hand, typically, the boundaries of the second phase particles are each formed by a single crystal. Moreover, since the grains and the second phase particles have different phases, they are characterized by having different colors on an SEM image. Furthermore, when a cross section of the aluminum alloy foil layer in the thickness direction is observed with an optical microscope, only the second phase particles look black because of the difference in phase between the grains and the second phase particles, which makes the observation easy.

In the battery packaging material according to the second aspect of the present invention, for any 100 second phase particles 32 within a field of view of an optical microscope in a cross section of the aluminum alloy foil layer 3 in the thickness direction, an average value of a diameter y of top 20 second phase particles 32 in decreasing order of the diameter y is 5.0 μm or less, where the diameter y is defined as a linear distance connecting the leftmost end of each of the second phase particles 32 in a direction perpendicular to the thickness direction and the rightmost end of the second phase particle 32 in the direction perpendicular to the thickness direction; therefore, the battery packaging material is unlikely to develop pinholes or cracks during molding, and has excellent moldability, even though the aluminum alloy foil having a very small thickness, i.e., for example, about 100 μm, and even 30 μm or less, is laminated on the battery packaging material. Furthermore, in the battery packaging material according to the second aspect, because the average value of the diameter y of the second phase particles 32 in the aluminum alloy foil layer 3 is 5.0 μm or less, the battery packaging material is unlikely to develop pinholes or cracks during molding, and has excellent moldability, even if the thickness of the aluminum alloy foil layer 3 is, for example, about 100 μm, and even 30 μm or less, and the total thickness of the battery packaging material is reduced to, for example, the above-described thickness.

In the second aspect, the average value of the diameter y of the second phase particles 32 in the aluminum alloy foil layer 3 may be 5.0 μm or less; however, from the viewpoint of further improving the moldability, the average value of the diameter y is preferably about 1.0 to 4.0 μm, and more preferably about 1.0 to 2.0 μm. As described above, since FIG. 3 is a schematic diagram, the illustration of 100 second phase particles 32 is omitted.

In the second aspect, from the viewpoint of further improving the moldability, the average grain diameter in the aluminum alloy foil layer 3 is preferably 10.0 μm or less, more preferably about 1.0 to 7.0 μm, and still more preferably about 1.0 to 3.2 μm. In the second aspect as well, when the average grain diameter in the aluminum alloy foil layer 3 is 10.0 μm or less, and the above-described diameter y of the second phase particles 32 is within the above-described range of values, the moldability of the battery packaging material can be even further improved.

In the battery packaging material according to the third aspect of the present invention, because aluminum alloy foil constituting the aluminum alloy foil layer has a load-to-displacement relationship that satisfies the following conditions (1) and (2) when subjected to a tensile test under the following test conditions, in accordance with the conditions as defined in JIS Z2241: 2011, the battery packaging material is unlikely to develop pinholes or cracks during molding, and has excellent moldability. Furthermore, in the battery packaging material according to the third aspect, because the conditions (1) and (2) are satisfied, the battery packaging material is unlikely to develop pinholes or cracks during molding, and has excellent moldability, even if the thickness of the aluminum alloy foil layer 3 is, for example, about 100 μm, and even 30 μm or less, and the total thickness of the battery packaging material is reduced to, for example, the above-described thickness.

(Test Conditions)

A thickness of a specimen is 15 μm, a width of the specimen is 15 mm, a distance between chucks is 100 mm, and a tensile speed is 20 mm/min, wherein a tensile direction is a 45° direction with respect to a rolling direction of the aluminum alloy foil as a reference direction (0°).

Condition (1): a load required for displacement of the aluminum alloy foil (in the 45° direction with respect to the rolling direction as a reference direction (0°)) to reach 15 mm from 0 mm is 15.0 N or more.

Condition (2): displacement at which a rupture occurs in the aluminum alloy foil (in the 45° direction with respect to the rolling direction as a reference direction (0°)) is 15 mm or more.

That is, in the battery packaging material according to the third aspect, the aluminum alloy foil evaluated using the above-described tensile test is the same as the aluminum alloy foil constituting the aluminum alloy foil layer 3 of the battery packaging material according to the third aspect, except that the thickness is 15 μm, and the aluminum alloy foil satisfies the conditions (1) and (2) when subjected to the tensile test.

In the condition (1), the load required for the displacement of the aluminum alloy foil to reach 15 mm from 0 mm is preferably about 15.0 to 25.0 N, and more preferably about 16.0 to 20.0 N.

In the condition (2), the displacement at which a rupture occurs in the aluminum alloy foil is preferably about 15 to 20 mm, and more preferably about 16 to 18 mm.

The mechanism by which the battery packaging material according to the third aspect is unlikely to develop pinholes or cracks during molding, and has excellent moldability, because the aluminum alloy foil satisfies the above-described conditions (1) and (2), is believed to be as follows: Specifically, when the battery packaging material is subjected to drawing, it requires resistance to displacement under a certain load or more, in order to withstand an impact due to being drawn by a punch. If the displacement of aluminum alloy foil reaches 15 mm from 0 mm under a load of less than 15.0 N, the aluminum alloy foil is considered to be weak against the impact due to being drawn by the punch. Furthermore, when the battery packaging material that has been drawn under an impact is further drawn to a predetermined depth, aluminum alloy foil that is easily stretchable is unlikely to develop pinholes. If the displacement at which a rupture occurs is less than 15 mm, pinholes will form before drawing to a predetermined depth is achieved. From these viewpoints, the aluminum alloy foil that satisfies the above-described conditions (1) and (2) is believed to be unlikely to develop pinholes or cracks during molding of the battery packaging material, and have excellent moldability. In the above-described test conditions, the 45° direction corresponds to a direction in which the aluminum alloy foil is most easily stretched during molding of the battery packaging material.

From the viewpoint of even further improving the moldability of the battery packaging material, the aluminum alloy foil in the battery packaging material according to the third aspect preferably further satisfies the following condition (3), in addition to the above-described conditions (1) and (2), when subjected to the same tensile test as described above:

condition (3): an increase in the load until the displacement of the aluminum alloy foil (in the 45° direction with respect to the rolling direction as a reference direction (0°)) reaches 5 mm from 1 mm is 3.0 N or less.

The mechanism by which the battery packaging material according to the third aspect has even further improved moldability, because the aluminum alloy foil layer 3 further satisfies the above-described condition (3) in addition to the conditions (1) and (2), is believed to be as follows: Specifically, when the battery packaging material is subjected to drawing, the less the load that is required in a stretching process after the initial impact applied by a punch, the more the initial impact force was converted into elongation; hence, deeper drawing is achieved without applying an additional load. From this viewpoint, the aluminum alloy foil layer 3 that satisfies the above-described condition (3) in addition to the conditions (1) and (2) is believed to have even further improved moldability.

In the condition (3), an increase in the load until the displacement of the aluminum alloy foil reaches 5 mm from 1 mm is preferably about 0.0 to 2.0 N, and more preferably about 0.0 to 1.0 N.

In the present invention, the composition of the aluminum alloy constituting the aluminum alloy foil layer 3 is not particularly limited; from the viewpoint of even further improving the moldability of the battery packaging material, the aluminum alloy preferably comprises 0.7 to 2.5 mass % of Fe, 0.05 mass % or less of Cu, and 0.30 mass % or less of Si.

Specific examples of aluminum alloys that form the aluminum alloy foil layer 3 include soft aluminum alloys such as annealed aluminum (JIS H4160 A8021H-O, JIS H4160 A8079H-O, JIS H4000: 2014 A8021P-O, and JISH4000: 2014 A807P-O). However, the average grain diameter and the diameter of the second phase particles according to the first and second aspects, as well as the conditions (1) to (3) according to the third aspect vary not only by the composition of the aluminum alloy, but also by the method of processing the aluminum alloy foil layer; therefore, the above-described thickness relationship and the load-to-displacement relationship are not satisfied only by the compositions defined in JIS, for example.

The alloys specified in JIS H4160 A8021H-O and JIS H4000: 2014 A8021P-O are part of the JIS 8021 series. The alloys specified in JIS H4160 A8079H-O and JIS H4000: 2014 A8079P-O are part of the JIS 8079 series. The chemical compositions of these alloy series are summarized in the table below.

| | Chemical Composition % | | | | | | | | | |
|---|---|---|---|---|---|---|---|---|---|---|
| | | | | | | | | Others | | |
| Alloy | Si | Fe | Cu | Mn | Mg | Zn | Ti | individual element | total | Al |
| 8021 | 0.15 max | 1.2 to 1.7 | 0.05 max | — | — | — | — | 0.05 max | 0.15 max | residue |
| 8079 | 0.05 to 0.03 | 0.7 to 1.3 | 0.05 max | — | — | 0.10 max | — | 0.05 max | 0.15 max | residue |

In the present invention, the adjustment of the average grain diameter or the diameter of the second phase particles of the aluminum alloy foil layer, as well as the adjustment of the conditions (1) to (3) can be accomplished using a known method. Examples of such methods include a method in which the firing temperature, the rolling conditions, and the like during the production of the aluminum alloy foil are adjusted. The following describes a method for adjusting the average grain diameter or the diameter of the second phase particles of the aluminum alloy foil layer 3 to the above-described value, using Al—Fe-based aluminum foil as an example.

(Example of Method for Forming Al—Fe-Based Aluminum Foil)

Al—Fe-based aluminum foil that has the average grain diameter or the diameter of the second phase particles according to the first or second aspect, and satisfies the conditions (1), (2), and (3) according to the third aspect, of the aluminum alloy foil layer, can be produced by performing steps such as dissolution, casting, slabbing, surface cutting, homogenization (homogenization treatment), hot rolling, cold rolling, intermediate annealing, cold rolling, foil rolling, and final annealing. In the dissolution and casting steps, JIS Standard A8079H-O, for example, is dissolved to prepare an ingot. In the hot rolling step, the alloy material after the homogenization treatment is rolled under a high-temperature environment. The hot rolling temperature for the alloy material in this step is preferably 280 to 300° C. Subsequently, in the cold rolling step, the hot rolled alloy material is cold rolled into a thin sheet. The cold rolling temperature for the alloy material in this step is preferably 110 to 240° C. Furthermore, in the intermediate annealing step, internal strains in the alloy material after the cold rolling are eliminated by heat treatment to soften the tissue, thereby improving the ductility. The treatment temperature in this step is preferably 380 to 400° C., and particularly preferably 390° C. The treatment time is preferably 1.5 to 2.5 hours. By adjusting these conditions as appropriate, the average grain diameter or the diameter of the second phase particles of the aluminum alloy foil layer, as well as the conditions (1), (2), and (3) can be adjusted.

Furthermore, in the present invention, preferably, at least one surface, preferably both surfaces, of the aluminum alloy foil layer 3 is/are subjected to a chemical conversion treatment, in order to stabilize the adhesion, and prevent dissolution or corrosion, for example. As used herein, the chemical conversion treatment refers to a treatment for forming an acid resistance film on a surface of the aluminum alloy foil layer. That is, the aluminum alloy foil layer 3 preferably comprises an acid resistance film on at least one surface thereof. Examples of chemical conversion treatments for forming the acid resistance film include a chromic acid chromate treatment using a chromic acid compound such as chromium nitrate, chromium fluoride, chromium sulfate, chromium acetate, chromium oxalate, chromium biphosphate, acetylacetate chromate, chromium chloride, or chromium potassium sulfate; a phosphoric acid chromate treatment using a phosphoric acid compound such as sodium phosphate, potassium phosphate, ammonium phosphate, or polyphosphoric acid; and a chromate treatment using an aminated phenol polymer having any of the repeating units represented by the following general formulae (1) to (4). In the aminated phenol polymer, the repeating units represented by the following general formulae (1) to (4) may be contained alone, or in combination of two or more.

(1)

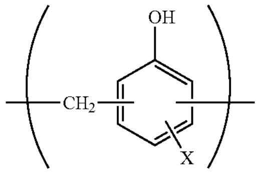

(2)

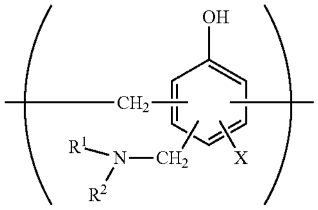

(3)

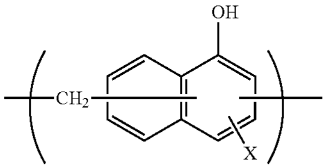

(4)

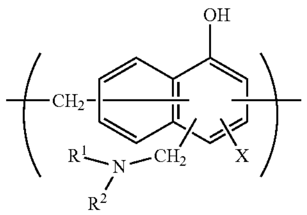

In the general formulae (1) to (4), X represents a hydrogen atom, a hydroxyl group, an alkyl group, a hydroxyalkyl group, an allyl group, or a benzyl group. $R^1$ and $R^2$ are the same or different, and each represent a hydroxyl group, an alkyl group, or a hydroxyalkyl group. In the general formulae (1) to (4), examples of alkyl groups represented by X, $R^1$, and $R^2$ include linear or branched alkyl groups having 1 to 4 carbon atoms, such as a methyl group, an ethyl group, a n-propyl group, an isopropyl group, a n-butyl group, an isobutyl group, and a tert-butyl group. Examples of hydroxyalkyl groups represented by X, $R^1$, and $R^2$ include linear or branched alkyl groups having 1 to 4 carbon atoms, which are substituted with one hydroxy group, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group, or a 4-hydroxybutyl group. In the general formulae (1) to (4), the alkyl groups and the hydroxyalkyl groups represented by X, $R^1$, and $R^2$ may be the same or different. In the general formulae (1) to (4), X is preferably a hydrogen atom, a hydroxyl group, or a hydroxyalkyl group. The number average molecular weight of the aminated phenol polymer having any of the repeating units represented by the general formulae (1) to (4) is, for example, about 500 to 1000000, preferably about 1000 to 20000.

Examples of chemical conversion treatment methods for imparting corrosion resistance to the aluminum alloy foil layer 3 include a method in which the aluminum alloy foil layer 3 is coated with a dispersion of fine particles of a metal oxide such as aluminum oxide, titanium oxide, cerium oxide, or tin oxide, or barium sulfate in phosphoric acid, and baked at 150° C. or higher to form a corrosion resistance treatment layer on a surface of the aluminum alloy foil layer 3. A resin layer obtained by cross-linking a cationic polymer with a crosslinking agent may also be formed on the corrosion resistance treatment layer. Examples of the cationic polymer to be used herein include polyethyleneimine, ion polymer complexes composed of polymers containing polyethyleneimine and carboxylic acids, primary amine-grafted acrylic resins obtained by grafting primary amines to an acrylic backbone, polyallylamine or derivatives thereof, and aminophenol. These cationic polymers may be used alone, or in combination of two or more. Examples of crosslinking agents include compounds having at least one functional group selected from the group consisting of an isocyanate group, a glycidyl group, a carboxyl group, and an oxazoline group, and silane coupling agents. These crosslinking agents may be used alone, or in combination of two or more.

One example of a specific method for providing an acid resistance film is as follows: Initially, at least the surface of an inner layer of the aluminum alloy foil is subjected to a degreasing treatment, using a well-known treatment method such as an alkali immersion method, an electrolytic cleaning method, an acid cleaning method, an electrolytic acid cleaning method, or an acid activation method. Then, a treatment solution (aqueous solution) containing, as a main component, a phosphoric acid metal salt such as Cr (chromium) phosphate, Ti (titanium) phosphate, Zr (zirconium) phosphate, or Zn (zinc) phosphate, or a mixture of these metal salts, or a treatment solution (aqueous solution) containing, as a main component, a phosphoric acid non-metal salt or a mixture of such salts, or a treatment solution (aqueous solution) containing a mixture of any of the above and an aqueous synthetic resin such as an acrylic-based resin, a phenol-based resin, or a urethane-based resin is applied to the degreasing treatment surface, using a well-known coating method such as a roll coating method, a gravure printing method, or an immersion method. As a result, an acid resistance film can be formed. For example, when the treatment is performed using a Cr (chromium) phosphate-based treatment solution, an acid resistance film composed of $CrPO_4$ (chromium phosphate), $AlPO_4$ (aluminum phosphate), $Al_2O_3$ (aluminum oxide), $Al(OH)_x$ (aluminum hydroxide), $AlF_x$ (aluminum fluoride), or the like is obtained. When the treatment is performed using a Zn (zinc) phosphate-based treatment solution, an acid resistance film composed of $Zn_2PO_4 \cdot 4H_2O$ (zinc phosphate hydrate), $AlPO_4$ (aluminum phosphate), $Al_2O_3$ (aluminum oxide), $Al(OH)_x$ (aluminum hydroxide), $AlF_x$ (aluminum fluoride), or the like is obtained.

Another example of a specific method for providing an acid resistance film is as follows: For example, initially, at least the surface of an inner layer of the aluminum alloy foil is subjected to a degreasing treatment, using a well-known treatment method such as an alkali immersion method, an electrolytic cleaning method, an acid cleaning method, an electrolytic acid cleaning method, or an acid activation method. Then, the degreasing treatment surface is subjected to a well-known anodization treatment. As a result, an acid resistance film can be formed.

Other examples of acid resistance films include phosphate-based films and chromate-based films. Examples of phosphates include zinc phosphate, iron phosphate, manganese phosphate, calcium phosphate, and chromium phosphate; and examples of chromates include chromium chromate.

Other examples of acid resistance films include acid resistance films composed of phosphates, chromates, fluorides, triazine-thiol compounds, and the like. When such an acid resistance film is formed, it prevents delamination between aluminum and the base material layer during embossing molding, and prevents dissolution or corrosion of the aluminum surface, particularly dissolution or corrosion of aluminum oxide present on the surface of aluminum, due to hydrogen fluoride produced by the reaction between the electrolyte and moisture. The acid resistance film also improves the adhesion (wettability) of the aluminum surface, and exhibits the effect of preventing delamination between the base material layer and aluminum during heat-sealing, as well as the effect of preventing delamination between the base material layer and aluminum during press molding in the case of embossed-type products. Among the materials that form the acid resistance film, an aqueous solution composed of three components, i.e., a phenol resin, a chromium(III) fluoride compound, and phosphoric acid, is preferably applied to the aluminum surface, and subjected to a drying and baking treatment.

The acid resistance film may also include a layer containing cerium oxide, phosphoric acid or a phosphate, an anionic polymer, and a crosslinking agent that crosslinks the anionic polymer, wherein the phosphoric acid or phosphate may be used in an amount of 1 to 100 parts by mass, per 100 parts by mass of the cerium oxide. The acid resistance film preferably has a multilayer structure that further includes a layer containing a cationic polymer and a crosslinking agent that crosslinks the cationic polymer.

The anionic polymer is preferably a copolymer that contains, as a main component, poly(meth)acrylic acid or a salt thereof, or (meth)acrylic acid or a salt thereof. The crosslinking agent is preferably at least one selected from the group consisting of compounds having any of an isocyanate group, a glycidyl group, a carboxyl group, and an oxazoline group as a functional group, and silane coupling agents.

The phosphoric acid or phosphate is preferably condensed phosphoric acid or a condensed phosphate.

These chemical conversion treatments may be performed alone, or in combination of two or more. The chemical conversion treatments may be performed using one compound alone, or using two or more compounds in combination. Preferred among these chemical conversion treatments is a chromic acid chromate treatment, or a chromate treatment using a chromic acid compound, a phosphoric acid compound, and the aminated phenol polymer in combination.

Specific examples of acid resistance films include an acid resistance film containing at least one of phosphates, chromates, fluorides, and triazine-thiols. An acid resistance film containing a cerium compound is also preferred. The cerium compound is preferably cerium oxide.

Specific examples of acid resistance films also include phosphate-based films, chromate-based films, fluoride-based films, and triazine-thiol compound-based films. These acid resistance films may be used alone, or in combination of two or more. The acid resistance film may also be one that is formed by subjecting the chemical conversion treatment surface of the aluminum alloy foil to a degreasing treatment, and then treating the degreasing treatment surface with a treatment solution containing a mixture of a phosphoric acid metal salt and an aqueous synthetic resin or a treatment solution containing a mixture of a phosphoric acid non-metal salt and an aqueous synthetic resin.

The composition of the acid resistance film can be analyzed using time-of-flight secondary ion mass spectrometry, for example. As a result of the analysis of the composition of the acid resistance film using time-of-flight secondary ion mass spectrometry, a peak derived from, for example, secondary ions composed of Ce, P, and O (for example, at least one of $Ce_2PO_4^+$, $CePO_4^-$, and the like) or a peak derived from, for example, secondary ions composed of Cr, P, and O (for example, at least one of $CrPO_2^+$, $CrPO_4^-$, and the like) is detected.

The amount of the acid resistance film to be formed on the surface of the aluminum alloy foil layer 3 in the chemical conversion treatment is not particularly limited; for example, when the above-described chromate treatment is performed, it is preferred that the chromic acid compound be contained in an amount of about 0.5 to 50 mg, preferably about 1.0 to 40 mg, calculated as chromium, the phosphorus compound be contained in an amount of about 0.5 to 50 mg, preferably about 1.0 to 40 mg, calculated as phosphorus, and the aminated phenol polymer be contained in an amount of about 1 to 200 mg, preferably about 5.0 to 150 mg, per $m^2$ of the surface of the aluminum alloy foil layer 3.

While the thickness of the acid resistance film is not particularly limited, it is preferably about 1 nm to 20 μm, more preferably about 1 to 100 nm, and still more preferably about 1 to 50 nm, from the viewpoint of the cohesive force of the film, and the adhesion force between the acid resistance film and the aluminum alloy foil or the heat-sealable resin layer. The thickness of the acid resistance film can be measured by observation with a transmission electron microscope, or a combination of observation with a transmission electron microscope and energy dispersive X-ray spectroscopy or electron energy loss spectroscopy.

The chemical conversion treatment is performed by applying the solution containing a compound to be used for forming the acid resistance film to a surface of the aluminum alloy foil layer, using a bar coating method, a roll coating method, a gravure coating method, an immersion method, or the like, followed by heating such that the temperature of the aluminum alloy foil layer becomes about 70 to 200° C. Moreover, before the aluminum alloy foil layer is subjected to the chemical conversion treatment, the aluminum alloy foil layer may be subjected to a degreasing treatment using an alkali immersion method, an electrolytic cleaning method, an acid cleaning method, an electrolytic acid cleaning method, or the like. The degreasing treatment allows the chemical conversion treatment of the surface of the aluminum alloy foil layer to be more efficiently performed.

[Heat-Sealable Resin Layer 4]

In the battery packaging material of the present invention, the heat-sealable resin layer 4 is a layer that is optionally provided, and positioned as an innermost layer. When the battery packaging material of the present invention comprises the heat-sealable resin layer, the heat-sealable resin layer is heat-sealed with itself during the assembly of a battery to hermetically seal the battery element.

While the resin component to be used for the heat-sealable resin layer 4 is not particularly limited so long as it is heat-sealable, examples thereof include a polyolefin, a cyclic polyolefin, a carboxylic acid-modified polyolefin, and a carboxylic acid-modified cyclic polyolefin.

Specific examples of the polyolefin include polyethylene such as low-density polyethylene, medium-density polyethylene, high-density polyethylene, and linear low-density polyethylene; polypropylene such as homopolypropylene, block copolymers of polypropylene (for example, block copolymers of propylene and ethylene), and random copolymers of polypropylene (for example, random copolymers of propylene and ethylene); and terpolymers of ethylene-butene-propylene; and the like. Among these polyolefins, polyethylene and polypropylene are preferred.

The cyclic polyolefin is a copolymer of an olefin and a cyclic monomer. Examples of the olefin as a constituent monomer of the cyclic polyolefin include ethylene, propylene, 4-methyl-1-pentene, styrene, butadiene, and isoprene. Examples of the cyclic monomer as a constituent monomer of the cyclic polyolefin include cyclic alkenes such as norbornene, specifically cyclic dienes such as cyclopentadiene, dicyclopentadiene, cyclohexadiene, and norbornadiene. Among these polyolefins, cyclic alkenes are preferred, and norbornene is more preferred.

The carboxylic acid-modified polyolefin is a polymer obtained by modifying the polyolefin by block polymerization or graft polymerization with a carboxylic acid. Examples of the carboxylic acid to be used for the modification include maleic acid, acrylic acid, itaconic acid, crotonic acid, maleic anhydride, and itaconic anhydride.

The carboxylic acid-modified cyclic polyolefin is a polymer obtained by replacing a portion of the monomers that form the cyclic polyolefin with an α,β-unsaturated carboxylic acid or an anhydride thereof, and copolymerizing them, or by block-polymerizing or graft-polymerizing an α,β-unsaturated carboxylic acid or an anhydride thereof onto a cyclic polyolefin. The cyclic polyolefin to be modified with a carboxylic acid is the same as described above. The carboxylic acid to be used for the modification is the same as described above.

Among these resin components, a carboxylic acid-modified polyolefin is preferred, and carboxylic acid-modified polypropylene is more preferred.

The heat-sealable resin layer 4 may be formed using one resin component alone, or may be formed using a blend polymer obtained by combining two or more resin components. Furthermore, the heat-sealable resin layer 4 may be composed of only one layer, or two or more layers formed of the same resin component or different resin components.

While the thickness of the heat-sealable resin layer 4 is not particularly limited so long as the heat-sealable resin layer 4 exhibits the function as a heat-sealable resin layer, it is preferably 60 μm or less, and more preferably about 15 to 40 μm.

[Adhesive Layer 5]

In the battery packaging material of the present invention, the adhesive layer 5 is a layer that is optionally provided between the aluminum alloy foil layer 3 and the heat-sealable resin layer 4, in order to strongly bond these layers.

The adhesive layer 5 is formed of an adhesive capable of bonding the aluminum alloy foil layer 3 and the heat-sealable resin layer 4. The adhesive to be used for forming the adhesive layer 5 is the same as those for the adhesive agent layer 5 in terms of adhesion mechanism, types of adhesive components, and the like. The adhesive component to be used for the adhesive layer 5 is preferably a polyolefin-based resin, more preferably a carboxylic acid-modified polyolefin, and particularly preferably carboxylic acid-modified polypropylene.

The thickness of the adhesive layer 5 is not particularly limited so long as the battery packaging material satisfies the above-described physical properties, while the adhesive layer 5 exhibits the function as an adhesive layer; for example, the thickness is about 2 to 50 μm, and preferably about 10 to 40 μm.

[Surface Coating Layer]

The battery packaging material of the present invention may optionally comprise a surface coating layer (not illustrated) on the base material layer 1 (opposite to the aluminum alloy foil layer 3 on the base material layer 1), for the purpose of improving the designability, electrolytic solution resistance, scratch resistance, and moldability, for example. The surface coating layer is a layer positioned as an outermost layer upon assembly of a battery.

The surface coating layer can be formed using, for example, polyvinylidene chloride, a polyester resin, a urethane resin, an acrylic resin, or an epoxy resin. In particular, the surface coating layer is preferably formed using a two-liquid curable resin. Examples of two-liquid curable resins that form the surface coating layer include two-liquid curable urethane resins, two-liquid curable polyester resins, and two-liquid curable epoxy resins. The surface coating layer may also contain a matting agent.

Examples of matting agents include fine particles having a particle diameter of about 0.5 nm to 5 μm. While the material of the matting agent is not particularly limited, examples thereof include metals, metal oxides, inorganic materials, and organic materials. Moreover, while the shape of the matting agent is not particularly limited, examples thereof include a spherical shape, a fibrous shape, a plate shape, an amorphous shape, and a balloon shape. Specific examples of matting agents include talc, silica, graphite, kaolin, montmorilloide, montmorillonite, synthetic mica, hydrotalcite, silica gel, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, calcium benzoate, calcium oxalate, magnesium stearate, alumina, carbon black, carbon nanotubes, high-melting-point nylons, crosslinked acrylics, crosslinked styrene, crosslinked polyethylene, benzoguanamine, gold, aluminum, copper, and nickel. These matting agents may be used alone, or in combination of two or more. Among these matting agents, silica, barium sulfate, and titanium oxide are preferred from the viewpoint of dispersion stability, costs, and the like. The surface of the matting agent may be subjected to various types of surface treatments, such as an insulation treatment and a dispersibility enhancing treatment.

Examples of methods for forming the surface coating layer include, although not particularly limited to, a method in which a two-liquid curable resin that forms the surface coating layer is applied to one surface of the base material layer 1. When a matting agent is used, the matting agent may be mixed into the two-liquid curable resin, and then the mixture may be applied.

The thickness of the surface coating layer is not particularly limited so long as the battery packaging material satisfies the above-described physical properties, while the surface coating layer exhibits the above-described function; for example, the thickness is about 0.5 to 10 μm, and preferably about 1 to 5 μm.

3. Method for Producing Battery Packaging Material

The method for producing the battery packaging material according to the first aspect of the present invention is not particularly limited so long as a laminate including layers each having a predetermined composition is obtained. For example, a method can be adopted which comprises the step of laminating at least a base material layer, an aluminum alloy foil layer, and a heat-sealable resin layer in this order to provide a laminate, wherein an aluminum alloy foil layer in which the above-described average grain diameter is 10.0 μm or less is used as the aluminum alloy foil layer 3.

The method for producing the battery packaging material according to the second aspect of the present invention is not particularly limited so long as a laminate including layers each having a predetermined composition is obtained. For example, a method can be adopted which comprises the step of laminating at least a base material layer, an aluminum alloy foil layer, and a heat-sealable resin layer in this order to provide a laminate, wherein, as the aluminum alloy foil layer 3, an aluminum alloy foil layer is used in which, for any 100 second phase particles within a field of view of an optical microscope in a cross section of the aluminum alloy foil layer in a thickness direction, an average value of a diameter y of top 20 second phase particles in decreasing order of the diameter y is 5.0 μm or less, where the diameter y is defined as a linear distance connecting a leftmost end of each of the second phase particles in a direction perpendicular to the thickness direction and a rightmost end of the second phase particle in the direction perpendicular to the thickness direction.

The method for producing the battery packaging material according to the third aspect of the present invention is not particularly limited so long as a laminate including layers each having a predetermined composition is obtained. For example, a method can be adopted which comprises the step of laminating at least a base material layer 1, an aluminum alloy foil layer 3, and a heat-sealable resin layer 4 in this order to provide a laminate, wherein aluminum alloy foil constituting the aluminum alloy foil layer has a load-to-displacement relationship that satisfies the above-described conditions (1) and (2) when subjected to a tensile test under the above-described test conditions, in accordance with the conditions as defined in JIS Z2241: 2011.

That is, the battery packaging material of the present invention can be produced by using the aluminum alloy foil layer 3 according to the first, second, or third aspect described in the "2. Layers That Form Battery Packaging Material" section as the aluminum alloy foil layer 3, and laminating the layers.

One example of a method for producing the battery packaging material of the present invention is as follows: Initially, a laminate in which the base material layer 1, the adhesive agent layer 2, and the aluminum alloy foil layer 3 are laminated in this order (the laminate may be hereinafter denoted as the "laminate A") is formed. Specifically, the laminate A can be formed using a dry lamination method as follows: The adhesive to be used for forming the adhesive agent layer 2 is applied to the base material layer 1 or the aluminum alloy foil layer 3 whose surface has been optionally subjected to a chemical conversion treatment, using a coating method such as a gravure coating method or a roll coating method, and then dried. Then, the aluminum alloy foil layer 3 or the base material layer 1 is laminated thereon, and the adhesive agent layer 2 is cured.

Next, the heat-sealable resin layer 4 is laminated on the aluminum alloy foil layer 3 of the laminate A. When the heat-sealable resin layer 4 is laminated directly on the aluminum alloy foil layer 3, a resin component that forms the heat-sealable resin layer 4 may be applied to the aluminum alloy foil layer 3 of the laminate A, using a method such as a gravure coating method or a roll coating method. When the adhesive layer 5 is provided between the aluminum alloy foil layer 3 and the heat-sealable resin layer 4, examples of methods for providing the adhesive layer 5 include the following: (1) a method in which the adhesive layer 5 and the heat-sealable resin layer 4 are co-extruded to be laminated on the aluminum alloy foil layer 3 of the laminate A (co-extrusion lamination method); (2) a method in which a laminate in which the adhesive layer 5 and the heat-sealable resin layer 4 are laminated is separately formed, and this laminate is laminated on the aluminum alloy foil layer 3 of the laminate A using a thermal lamination method; (3) a method in which the adhesive for forming the adhesive layer 5 is laminated on the aluminum alloy foil layer 3 of the laminate A by, for example, applying the adhesive onto the aluminum alloy foil layer 3 using an extrusion method or solution coating, followed by drying at a high temperature and baking, and then the heat-sealable resin layer 4 formed into a sheet in advance is laminated on the adhesive layer 5 using a thermal lamination method; and (4) a method in which the melted adhesive layer 5 is poured between the aluminum alloy foil layer 3 of the laminate A and the heat-sealable resin layer 4 formed into a sheet in advance, and simultaneously the laminate A and the heat-sealable resin layer 4 are bonded with the adhesive layer 5 interposed therebetween (sandwich lamination method).

When the surface coating layer is provided, the surface coating layer is laminated on the surface of the base material layer 1 opposite to the aluminum alloy foil layer 3. The surface coating layer can be formed by, for example, applying the above-described resin that forms the surface coating layer onto the surface of the base material layer 1. The order of the step of laminating the aluminum alloy foil layer 3 on the surface of the base material layer 1 and the step of laminating the surface coating layer on the surface of the base material layer 1 is not particularly limited. For example, the surface coating layer may be formed on the surface of the base material layer 1, and then the aluminum alloy foil layer 3 may be formed on the surface of the base material layer 1 opposite to the surface coating layer.

In the manner as described above, a laminate including the optionally provided surface coating layer/the base material layer 1/the optionally provided adhesive agent layer 2/the aluminum alloy foil layer 3 whose surface has been optionally subjected to a chemical conversion treatment/the optionally provided adhesive layer 5/the heat-sealable resin layer 4 is formed. The laminate may further be subjected to a heat treatment of a heat-roll contact type, a hot-air type, or a near- or far-infrared radiation type, in order to enhance the adhesion of the optionally provided adhesive agent layer 2 and the adhesive layer 5. Such a heat treatment may be performed, for example, at 150 to 250° C. for 1 to 5 minutes.

In the battery packaging material of the present invention, the layers that form the laminate may be optionally subjected to a surface activation treatment such as a corona treatment, a blast treatment, an oxidation treatment, or an ozone treatment, in order to improve or stabilize the film formability, lamination processing, and suitability for final product secondary processing (pouching and embossing molding), and the like.

4. Use of Battery Packaging Material

The battery packaging material of the present invention is used as a packaging material for hermetically sealing and housing battery elements such as a positive electrode, a negative electrode, and an electrolyte.

Specifically, a battery that uses the battery packaging material is provided as follows: A battery element comprising at least a positive electrode, a negative electrode, and an electrolyte is covered with the battery packaging material of the present invention such that a flange portion (region where the heat-sealable resin layer is brought into contact with itself) can be formed on the periphery of the battery element, while a metal terminal connected to each of the positive electrode and the negative electrode protrudes to the outside. Then, the heat-sealable resin layer in the flange portion is heat-sealed with itself to hermetically seal the battery element. When the battery packaging material of the present invention is used to house the battery element, it is used such that the heat-sealable resin layer is positioned on the inner side (surface that contacts the battery element) thereof.

The battery packaging material of the present invention may be used for either primary batteries or secondary batteries, preferably secondary batteries. While the type of secondary battery to which the battery packaging material of the present invention is applied is not particularly limited, examples thereof include lithium ion batteries, lithium ion polymer batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers, and capacitors. Among these secondary batteries, preferred secondary batteries to which the battery packaging material of the present invention is applied include lithium ion batteries and lithium ion polymer batteries.

EXAMPLES

The present invention will be hereinafter described in detail with reference to examples and comparative examples; however, the present invention is not limited to the examples.

Examples 1A-22A and Comparative Examples 1A-14A

<Production of Battery Packaging Materials>

Aluminum alloy foil (with a thickness as set forth in Tables 1A to 4A for each example) whose both surfaces had been subjected to a chemical conversion treatment was laminated on a base material layer, using a dry lamination method. Specifically, a two-liquid urethane adhesive (a polyol compound and an aromatic isocyanate-based compound) was applied to one surface of the aluminum alloy foil having an average grain diameter and a second phase particle diameter as set forth in Tables 3A and 4A to form an adhesive agent layer on the aluminum alloy foil layer. Next, the adhesive agent layer on the aluminum alloy foil layer and the base material layer were laminated together using a dry lamination method, and then subjected to an aging treatment at 40° C. for 24 hours to prepare a laminate having the base material layer/the adhesive agent layer/the aluminum alloy foil layer. The chemical conversion treatment of the aluminum foil was performed by applying a treatment solution containing a phenol resin, a chromium fluoride compound, and phosphoric acid to both surfaces of the aluminum foil using a roll coating method, such that the amount of chromium applied became 10 mg/$m^2$ (dry mass), followed by baking for 20 seconds under conditions such that the film temperature became 180° C. or higher. Next, carboxylic acid-modified polypropylene (to be disposed on the aluminum alloy foil layer) and random polypropylene (to be disposed as an innermost layer) were co-extruded onto the aluminum alloy foil layer of the laminate, thereby laminating an adhesive layer and a heat-sealable resin layer on the aluminum alloy foil layer. As a result, a battery packaging material was obtained in which the base material layer/the adhesive agent layer/the aluminum alloy foil layer/the adhesive layer/the heat-sealable resin layer were laminated in this order. The thickness of each of the layers is as set forth in Tables 1A and 2A. In Tables 1A and 2A, PET denotes polyethylene terephthalate, DL denotes the adhesive agent layer, ONy denotes stretched nylon, PPa denotes carboxylic acid-modified polypropylene, and PP denotes random polypropylene. In the base material layer, PET, DL, and ONy were laminated in this order, and ONy was positioned on the aluminum alloy layer. A specific material of the aluminum alloy foil was as follows:

<Aluminum Alloy Foil>

A8021 Material: Soft Aluminum (JIS H4160 A8021H-O)

The average grain diameter and the second phase particles of the aluminum alloy were adjusted by changing the rolling conditions and the like. Specifically, aluminum alloys produced by changing the rolling conditions and the like in various manners were measured for average grain diameter and second phase particles, and then used for producing the battery packaging materials of the examples and comparative examples.

<Measurement of Average Grain Diameter of Aluminum Alloy Foil>

The average grain diameter in the aluminum alloy foil used as the aluminum alloy foil layer in each of the examples and comparative examples was determined as the following value: when a cross section of the aluminum alloy foil layer in the thickness direction is observed with a scanning electron microscope, for any 100 aluminum alloy grains positioned within a field of view, an average value of a maximum diameter x of the 100 grains, where the maximum diameter x is defined as a linear distance connecting the leftmost end of each of the grains in a direction perpendicular to the thickness direction and the rightmost end of the grain in the direction perpendicular to the thickness direction. The results are shown in Tables 3A and 4A.

<Measurement of Second Phase Particle Diameter of Aluminum Alloy Foil>

The second phase particle diameter in the aluminum alloy foil used as the aluminum alloy foil layer in each of the examples and comparative examples was determined as an average value of a diameter y of top 20 second phase particles in decreasing order of the diameter y, out of any 100 second phase particles within a field of view of an optical microscope in a cross section of the aluminum alloy foil layer in the thickness direction, where the maximum diameter y is defined as a linear distance connecting a leftmost end of each of the second phase particles in a direction perpendicular to the thickness direction and a rightmost end of the second phase particle in the direction perpendicular to the thickness direction. The results are shown in Tables 3A and 4A.

(Evaluation of Moldability)

Each of the battery packaging materials obtained as described above was cut into a rectangle of 80×120 mm to prepare a sample. Using a molding die (die) having a diameter of 30×50 mm and a corresponding molding die (punch), the sample was cold-formed while changing the molding depth in 0.5 mm increments from a molding depth of 0.5 mm, under a pressing force of 0.4 MPa. The cold forming was performed for 10 samples at each depth. For the samples after the cold forming, the deepest molding depth at which all the 10 samples of the battery packaging material did not develop pinholes or cracks was defined as the limit molding depth of the samples. The moldability of the battery packaging material was evaluated based on this limit molding depth, using the following criteria. Since the limit molding depth tends to increase as the thickness of the aluminum alloy foil increases, the criteria for evaluating moldability were set for each thickness of the aluminum alloy foil. The results are shown in Tables 3A and 4A.

[Evaluation Criteria 1: When the Thickness of the Aluminum Alloy Foil was 100 μm]

A1: The limit molding depth was 20.0 mm or more.
B1: The limit molding depth was 19.0 to 19.5 mm.
C1: The limit molding depth was 18.0 to 18.5 mm.
D1: The limit molding depth was 17.5 mm or less.

[Evaluation Criteria 2: When the Thickness of the Aluminum Alloy Foil was 80 μm]

A2: The limit molding depth was 17.0 mm or more.
B2: The limit molding depth was 16.0 to 16.5 mm.
C2: The limit molding depth was 15.0 to 15.5 mm.
D2: The limit molding depth was 14.5 mm or less.

[Evaluation Criteria 3: When the Thickness of the Aluminum Alloy Foil was 50 μm]

A3: The limit molding depth was 10.0 mm or more.
B3: The limit molding depth was 9.0 to 9.5 mm.
C3: The limit molding depth was 8.0 to 8.5 mm.
D3: The limit molding depth was 7.5 mm or less.

[Evaluation Criteria 4: When the Thickness of the Aluminum Alloy Foil was 40 μm]

A4: The limit molding depth was 9.0 mm or more.
B4: The limit molding depth was 8.0 to 8.5 mm.
C4: The limit molding depth was 7.0 to 7.5 mm.
D4: The limit molding depth was 6.5 mm or less.

[Evaluation Criteria 5: When the Thickness of the Aluminum Alloy Foil was 35 μm]

A5: The limit molding depth was 8.0 mm or more.
B5: The limit molding depth was 7.0 to 7.5 mm.
C5: The limit molding depth was 6.0 to 6.5 mm.
D5: The limit molding depth was 5.5 mm or less.

[Evaluation Criteria 6: When the Thickness of the Aluminum Alloy Foil was 30 μm]

A6: The limit molding depth was 7.0 mm or more.
B6: The limit molding depth was 6.0 to 6.5 mm.
C6: The limit molding depth was 5.0 to 5.5 mm.
D6: The limit molding depth was 4.5 mm or less.

[Evaluation Criteria 7: When the Thickness of the Aluminum Alloy Foil was 25 μm]

A7: The limit molding depth was 6.5 mm or more.
B7: The limit molding depth was 5.5 to 6.0 mm.
C7: The limit molding depth was 4.5 to 5.0 mm.
D7: The limit molding depth was 4.0 mm or less.

[Evaluation Criteria 8: When the Thickness of the Aluminum Alloy Foil was 20 μm]

A8: The limit molding depth was 6.0 mm or more.
B8: The limit molding depth was 5.0 to 5.5 mm.
C8: The limit molding depth was 4.0 to 4.5 mm.
D8: The limit molding depth was 3.5 mm or less.

[Evaluation Criteria 9: When the Thickness of the Aluminum Alloy Foil was 15 μm]

A9: The limit molding depth was 5.5 mm or more.
B9: The limit molding depth was 4.5 to 5.0 mm.
C9: The limit molding depth was 3.5 to 4.0 mm.
D9: The limit molding depth was 3.0 mm or less.

TABLE 1A

| | Base Material Layer | | | Adhesive Agent Layer | Aluminum Alloy | Adhesive Layer | Heat-Sealable Resin Layer | Total Thickness of |
|---|---|---|---|---|---|---|---|---|
| | PET (μm) | DL (μm) | ONy (μm) | DL (μm) | Foil Layer (μm) | PPa (μm) | PP (μm) | Laminate (μm) |
| Example 1A | — | — | 25 | 3 | 100 | 30 | 30 | 188 |
| Example 2A | 12 | 3 | 25 | 3 | 100 | 30 | 30 | 203 |
| Example 3A | — | — | 25 | 3 | 80 | 30 | 30 | 168 |
| Example 4A | 12 | 3 | 25 | 3 | 80 | 30 | 30 | 183 |
| Example 5A | — | — | 25 | 3 | 50 | 22.5 | 22.5 | 123 |
| Example 6A | 12 | 3 | 25 | 3 | 50 | 22.5 | 22.5 | 138 |
| Example 7A | — | — | 25 | 3 | 40 | 22.5 | 22.5 | 113 |
| Example 8A | 12 | 3 | 25 | 3 | 40 | 22.5 | 22.5 | 128 |
| Example 9A | — | — | 15 | 3 | 35 | 20 | 15 | 88 |
| Example 10A | 12 | 3 | 15 | 3 | 35 | 20 | 15 | 103 |
| Example 11A | — | — | 15 | 3 | 30 | 14 | 10 | 72 |
| Example 12A | 12 | 3 | 15 | 3 | 30 | 14 | 10 | 87 |
| Example 13A | — | — | 15 | 3 | 30 | 14 | 10 | 72 |
| Example 14A | 12 | 3 | 15 | 3 | 30 | 14 | 10 | 87 |
| Example 15A | — | — | 15 | 3 | 30 | 14 | 10 | 72 |
| Example 16A | 12 | 3 | 15 | 3 | 30 | 14 | 10 | 87 |
| Example 17A | — | — | 15 | 3 | 25 | 14 | 10 | 67 |
| Example 18A | 12 | 3 | 15 | 3 | 25 | 14 | 10 | 82 |
| Example 19A | — | — | 15 | 3 | 20 | 14 | 10 | 62 |
| Example 20A | 12 | 3 | 15 | 3 | 20 | 14 | 10 | 77 |
| Example 21A | — | — | 15 | 3 | 15 | 14 | 10 | 57 |
| Example 22A | 12 | 3 | 15 | 3 | 15 | 14 | 10 | 72 |

TABLE 2A

| | Base Material Layer | | | Adhesive Agent Layer | Aluminum Alloy | Adhesive Layer | Heat-Sealable Resin Layer | Total Thickness of |
|---|---|---|---|---|---|---|---|---|
| | PET (μm) | DL (μm) | ONy (μm) | DL (μm) | Foil Layer (μm) | PPa (μm) | PP (μm) | Laminate (μm) |
| Comparative Example 1A | — | — | 25 | 3 | 100 | 30 | 30 | 188 |
| Comparative Example 2A | 12 | 3 | 25 | 3 | 100 | 30 | 30 | 203 |
| Comparative Example 3A | — | — | 25 | 3 | 80 | 30 | 30 | 168 |
| Comparative Example 4A | 12 | 3 | 25 | 3 | 80 | 30 | 30 | 183 |
| Comparative Example 5A | — | — | 25 | 3 | 50 | 22.5 | 22.5 | 123 |
| Comparative Example 6A | 12 | 3 | 25 | 3 | 50 | 22.5 | 22.5 | 138 |
| Comparative Example 7A | — | — | 25 | 3 | 40 | 22.5 | 22.5 | 113 |
| Comparative Example 8A | 12 | 3 | 25 | 3 | 40 | 22.5 | 22.5 | 128 |
| Comparative Example 9A | — | — | 15 | 3 | 35 | 20 | 15 | 88 |
| Comparative Example 10A | 12 | 3 | 15 | 3 | 35 | 20 | 15 | 103 |
| Comparative Example 11A | — | — | 15 | 3 | 30 | 14 | 10 | 72 |
| Comparative Example 12A | 12 | 3 | 15 | 3 | 30 | 14 | 10 | 87 |
| Comparative Example 13A | — | — | 15 | 3 | 15 | 14 | 10 | 57 |
| Comparative Example 14A | 12 | 3 | 15 | 3 | 15 | 14 | 10 | 72 |

TABLE 3A

| | Aluminum Alloy Foil | | | | |
| --- | --- | --- | --- | --- | --- |
| | Thickness (μm) | Average Grain Diameter (μm) | Second Phase Particle Diameter (μm) | Total Thickness of Laminate (μm) | Moldability Evaluation |
| Example 1A | 100 | 2.9 | 1.3 | 188 | A1 |
| Example 2A | 100 | 3.5 | 1.0 | 203 | A1 |
| Example 3A | 80 | 3.0 | 1.1 | 168 | A2 |
| Example 4A | 80 | 3.2 | 1.1 | 183 | A2 |
| Example 5A | 50 | 2.8 | 1.3 | 123 | A3 |
| Example 6A | 50 | 2.9 | 1.0 | 138 | A3 |
| Example 7A | 40 | 3.2 | 1.0 | 113 | A4 |
| Example 8A | 40 | 3.3 | 1.2 | 128 | A4 |
| Example 9A | 35 | 3.4 | 1.1 | 88 | A5 |
| Example 10A | 35 | 3.5 | 1.4 | 103 | A5 |
| Example 11A | 30 | 9.4 | 5.4 | 72 | B6 |
| Example 12A | 30 | 8.8 | 5.3 | 87 | B6 |
| Example 13A | 30 | 6.6 | 4.6 | 72 | A6 |
| Example 14A | 30 | 7.0 | 4.4 | 87 | A6 |
| Example 15A | 30 | 2.5 | 1.2 | 72 | A6 |
| Example 16A | 30 | 3.0 | 1.0 | 87 | A6 |
| Example 17A | 25 | 3.1 | 1.1 | 67 | A7 |
| Example 18A | 25 | 2.8 | 1.2 | 82 | A7 |
| Example 19A | 20 | 3.1 | 1.0 | 62 | A8 |
| Example 20A | 20 | 3.0 | 1.0 | 77 | A8 |
| Example 21A | 15 | 3.2 | 1.2 | 57 | A9 |
| Example 22A | 15 | 2.8 | 1.0 | 72 | A9 |

TABLE 4A

| | Aluminum Alloy Foil | | | | |
| --- | --- | --- | --- | --- | --- |
| | Thickness (μm) | Average Grain Diameter (μm) | Second Phase Particle Diameter (μm) | Total Thickness of Laminate (μm) | Moldability Evaluation |
| Comparative Example1A | 100 | 12.0 | 5.5 | 188 | D1 |
| Comparative Example 2A | 100 | 11.2 | 5.9 | 203 | D1 |
| Comparative Example 3A | 80 | 10.9 | 6.0 | 168 | D2 |
| Comparative Example 4A | 80 | 10.8 | 6.1 | 183 | D2 |
| Comparative Example 5A | 50 | 11.3 | 6.3 | 123 | D3 |
| Comparative Example 6A | 50 | 11.5 | 6.4 | 138 | D3 |
| Comparative Example 7A | 40 | 10.6 | 5.5 | 113 | D4 |
| Comparative Example 8A | 40 | 10.5 | 5.4 | 128 | D4 |
| Comparative Example 9A | 35 | 12.0 | 5.8 | 88 | D5 |
| Comparative Example 10A | 35 | 12.2 | 5.9 | 103 | D5 |
| Comparative Example 11A | 30 | 11.0 | 6.2 | 72 | D6 |
| Comparative Example 12A | 30 | 11.5 | 5.5 | 87 | D6 |
| Comparative Example 13A | 15 | 11.8 | 5.8 | 57 | D9 |
| Comparative Example 14A | 15 | 11.4 | 5.5 | 72 | D9 |

As is evident from the results shown in Table 3A, the battery packaging materials in which the average grain diameter of the aluminum alloy foil was 10 μm or less had excellent moldability. Furthermore, the battery packaging materials in which the average grain diameter of the aluminum alloy foil was 10 μm or less, and the second phase particle diameter was 5 μm or less had particularly excellent moldability. In contrast, as shown in Table 4A, the battery packaging materials in which the average grain diameter of the aluminum alloy foil was over 10 μm were inferior in moldability.

Examples 1B-24B and Comparative Examples 1B-14B

<Production of Battery Packaging Materials>

Aluminum alloy foil (with a thickness as set forth in Tables 1B and 2B for each example) whose both surfaces had been subjected to a chemical conversion treatment was laminated on a base material layer, using a dry lamination method. Specifically, a two-liquid urethane adhesive (a polyol compound and an aromatic isocyanate-based compound) was applied to one surface of the aluminum alloy foil having a second phase particle diameter and an average grain diameter as set forth in Table 2B to form an adhesive agent layer on the aluminum alloy foil layer. Next, the adhesive agent layer on the aluminum alloy foil layer and the base material layer were laminated together using a dry lamination method, and then subjected to an aging treatment at 40° C. for 24 hours to prepare a laminate having the base material layer/the adhesive agent layer/the aluminum alloy foil layer. The chemical conversion treatment of the aluminum foil was performed by applying a treatment solution containing a phenol resin, a chromium fluoride compound, and phosphoric acid to both surfaces of the aluminum foil using a roll coating method, such that the amount of chromium applied became 10 mg/m$^2$ (dry weight), followed by baking for 20 seconds under conditions such that the film temperature became 180° C. or higher. Next, carboxylic acid-modified polypropylene (to be disposed on the aluminum alloy foil layer) and random polypropylene (to be disposed as an innermost layer) were co-extruded onto the aluminum alloy foil layer of the laminate, thereby laminating an adhesive layer and a heat-sealable resin layer on the aluminum alloy foil layer. As a result, a battery packaging material was obtained in which the base material layer/the adhesive agent layer/the aluminum alloy foil layer/the adhesive layer/the heat-sealable resin layer were laminated in this order. The thickness of each of the layers is as set forth in Table 1B. In Tables 1B and 2B, PET denotes polyethylene terephthalate, DL denotes the adhesive agent layer, ONy denotes stretched nylon, PPa denotes carboxylic acid-modified polypropylene, and PP denotes random polypropylene. In the base material layer, PET, DL, and ONy were laminated in this order, and ONy was positioned on the aluminum alloy layer. A specific material of the aluminum alloy foil was as follows:

<Aluminum Alloy Foil>

A8021 Material: Soft Aluminum (JIS H4160 A8021H-O)

The second phase particles and the average grain diameter of the aluminum alloy were adjusted by changing the rolling conditions and the like. Specifically, aluminum alloys produced by changing the rolling conditions and the like in various manners were measured for second phase particles and average grain diameter, and then used for producing the battery packaging materials of the examples and comparative examples.

<Measurement of Second Phase Particle Diameter of Aluminum Alloy Foil>

The second phase particle diameter in the aluminum alloy foil used as the aluminum alloy foil layer in each of the examples and comparative examples was determined as an average value of a diameter y of top 20 second phase particles in decreasing order of the diameter y, out of any 100 second phase particles within a field of view of an optical microscope in a cross section of the aluminum alloy foil layer in the thickness direction, where the maximum diameter y is defined as a linear distance connecting the leftmost end of each of the second phase particles in a direction perpendicular to the thickness direction and the rightmost end of the second phase particle in the direction perpendicular to the thickness direction. The results are shown in Table 2B.

<Measurement of Average Grain Diameter of Aluminum Alloy Foil>

The average grain diameter in the aluminum alloy foil used as the aluminum alloy foil layer in each of the examples and comparative examples was determined as the following value: when a cross section of the aluminum alloy foil layer in the thickness direction is observed with a scanning electron microscope, for any 100 aluminum alloy grains positioned within a field of view, an average value of a maximum diameter x of the 100 grains, where the maximum diameter x is defined as a linear distance connecting the leftmost end of each of the grains in a direction perpendicular to the thickness direction and the rightmost end of the grain in the direction perpendicular to the thickness direction. The results are shown in Table 2B.

(Evaluation of Moldability)

Each of the battery packaging materials obtained as described above was cut into a rectangle of 80×120 mm to prepare a sample. Using a molding die (die) having a diameter of 30×50 mm and a corresponding molding die (punch), the sample was cold-formed while changing the molding depth in 0.5 mm increments from a molding depth of 0.5 mm, under a pressing force of 0.4 MPa. The cold forming was performed for 10 samples at each depth. For the samples after the cold forming, the deepest molding depth at which all the 10 samples of the battery packaging material did not develop pinholes or cracks was defined as the limit molding depth of the samples. The moldability of the battery packaging material was evaluated based on this limit molding depth, using the same criteria as those for Examples 1A-22A and Comparative Examples 1A-14A above. The results are shown in Table 2B.

TABLE 1B

| | Base Material Layer | | | Adhesive Agent Layer | Aluminum Alloy Foil Layer | Adhesive Layer | Heat-Sealable Resin Layer | Total Thickness of Laminate |
|---|---|---|---|---|---|---|---|---|
| | PET (μm) | DL (μm) | ONy (μm) | DL (μm) | (μm) | PPa (μm) | PP (μm) | (μm) |
| Example 1B | | | 25 | 3 | 100 | 30 | 30 | 188 |
| Example 2B | 12 | 3 | 25 | 3 | 100 | 30 | 30 | 203 |
| Example 3B | | | 25 | 3 | 80 | 30 | 30 | 168 |
| Example 4B | 12 | 3 | 25 | 3 | 80 | 30 | 30 | 183 |
| Example 5B | | | 25 | 3 | 50 | 22.5 | 22.5 | 123 |
| Example 6B | 12 | 3 | 25 | 3 | 50 | 22.5 | 22.5 | 138 |
| Example 7B | | | 25 | 3 | 40 | 22.5 | 22.5 | 113 |
| Example 8B | 12 | 3 | 25 | 3 | 40 | 22.5 | 22.5 | 128 |
| Example 9B | | | 15 | 3 | 35 | 20 | 15 | 88 |
| Example 10B | 12 | 3 | 15 | 3 | 35 | 20 | 15 | 103 |
| Example 11B | | | 15 | 3 | 30 | 14 | 10 | 72 |
| Example 12B | 12 | 3 | 15 | 3 | 30 | 14 | 10 | 87 |
| Example 13B | | | 15 | 3 | 15 | 14 | 10 | 57 |
| Example 14B | 12 | 3 | 15 | 3 | 15 | 14 | 10 | 72 |
| Example 15B | | | 15 | 3 | 30 | 14 | 10 | 72 |
| Example 16B | 12 | 3 | 15 | 3 | 30 | 14 | 10 | 87 |
| Example 17B | | | 15 | 3 | 30 | 14 | 10 | 72 |
| Example 18B | 12 | 3 | 15 | 3 | 30 | 14 | 10 | 87 |
| Example 19B | | | 15 | 3 | 25 | 14 | 10 | 67 |
| Example 20B | 12 | 3 | 15 | 3 | 25 | 14 | 10 | 82 |
| Example 21B | | | 15 | 3 | 20 | 14 | 10 | 62 |

TABLE 1B-continued

| | Base Material Layer | | | Adhesive Agent Layer | Aluminum Alloy | Adhesive Layer | Heat-Sealable Resin Layer | Total Thickness |
|---|---|---|---|---|---|---|---|---|
| | PET (μm) | DL (μm) | ONy (μm) | DL (μm) | Foil Layer (μm) | PPa (μm) | PP (μm) | of Laminate (μm) |
| Example 22B | 12 | 3 | 15 | 3 | 20 | 14 | 10 | 77 |
| Example 23B | | | 15 | 3 | 15 | 14 | 10 | 57 |
| Example 24B | 12 | 3 | 15 | 3 | 15 | 14 | 10 | 72 |
| Comparative Example 1B | | | 25 | 3 | 100 | 30 | 30 | 188 |
| Comparative Example 2B | 12 | 3 | 25 | 3 | 100 | 30 | 30 | 203 |
| Comparative Example 3B | | | 25 | 3 | 80 | 30 | 30 | 168 |
| Comparative Example 4B | 12 | 3 | 25 | 3 | 80 | 30 | 30 | 183 |
| Comparative Example 5B | | | 25 | 3 | 50 | 22.5 | 22.5 | 123 |
| Comparative Example 6B | 12 | 3 | 25 | 3 | 50 | 22.5 | 22.5 | 138 |
| Comparative Example 7B | | | 25 | 3 | 40 | 22.5 | 22.5 | 113 |
| Comparative Example 8B | 12 | 3 | 25 | 3 | 40 | 22.5 | 22.5 | 128 |
| Comparative Example 9B | | | 15 | 3 | 35 | 20 | 15 | 88 |
| Comparative Example 10B | 12 | 3 | 15 | 3 | 35 | 20 | 15 | 103 |
| Comparative Example 11B | | | 15 | 3 | 30 | 14 | 10 | 72 |
| Comparative Example 12B | 12 | 3 | 15 | 3 | 30 | 14 | 10 | 87 |
| Comparative Example 13B | | | 15 | 3 | 15 | 14 | 10 | 57 |
| Comparative Example 14B | 12 | 3 | 15 | 3 | 15 | 14 | 10 | 72 |

TABLE 2B

| | Aluminum Alloy Foil | | | | |
|---|---|---|---|---|---|
| | Thickness (μm) | Second Phase Particle Diameter (μm) | Average Grain Diameter (μm) | Total Thickness of Laminate (μm) | Moldability Evaluation |
| Example 1B | 100 | 1.1 | 3.3 | 188 | A1 |
| Example 2B | 100 | 1.2 | 3.1 | 203 | A1 |
| Example 3B | 80 | 2.0 | 2.8 | 168 | A2 |
| Example 4B | 80 | 2.3 | 2.9 | 183 | A2 |
| Example 5B | 50 | 4.2 | 3.5 | 123 | A3 |
| Example 6B | 50 | 4.6 | 3.4 | 138 | A3 |
| Example 7B | 40 | 1.6 | 2.5 | 113 | A4 |
| Example 8B | 40 | 1.5 | 2.6 | 128 | A4 |
| Example 9B | 35 | 3.0 | 2.6 | 88 | A5 |
| Example 10B | 35 | 2.9 | 2.7 | 103 | A5 |
| Example 11B | 30 | 3.0 | 10.5 | 72 | B6 |
| Example 12B | 30 | 4.4 | 10.8 | 87 | B6 |
| Example 13B | 15 | 3.2 | 10.5 | 57 | B9 |
| Example 14B | 15 | 3.5 | 10.6 | 72 | B9 |
| Example 15B | 30 | 4.6 | 6.6 | 72 | A6 |
| Example 16B | 30 | 4.4 | 7.0 | 87 | A6 |
| Example 17B | 30 | 1.2 | 2.5 | 72 | A6 |
| Example 18B | 30 | 1.0 | 3.0 | 87 | A6 |
| Example 19B | 25 | 1.1 | 3.1 | 67 | A7 |
| Example 20B | 25 | 1.2 | 2.8 | 82 | A7 |
| Example 21B | 20 | 1.0 | 3.1 | 62 | A8 |
| Example 22B | 20 | 1.0 | 3.0 | 77 | A8 |
| Example 23B | 15 | 1.2 | 3.2 | 57 | A9 |
| Example 24B | 15 | 1.0 | 2.8 | 72 | A9 |
| Comparative Example 1B | 100 | 6.0 | 12.0 | 188 | D1 |
| Comparative Example 2B | 100 | 5.8 | 11.6 | 203 | D1 |
| Comparative Example 3B | 80 | 6.8 | 12.5 | 168 | D2 |
| Comparative Example 4B | 80 | 7.0 | 12.3 | 183 | D2 |
| Comparative Example 5B | 50 | 5.7 | 11.0 | 123 | D3 |
| Comparative Example 6B | 50 | 5.5 | 11.2 | 138 | D3 |
| Comparative Example 7B | 40 | 6.5 | 10.5 | 113 | D4 |
| Comparative Example 8B | 40 | 6.3 | 10.7 | 128 | D4 |
| Comparative Example 9B | 35 | 5.4 | 11.6 | 88 | D5 |
| Comparative Example 10B | 35 | 5.7 | 11.2 | 103 | D5 |
| Comparative Example 11B | 30 | 6.2 | 11.0 | 72 | D6 |
| Comparative Example 12B | 30 | 5.5 | 11.5 | 87 | D6 |
| Comparative Example 13B | 15 | 5.8 | 11.8 | 57 | D9 |
| Comparative Example 14B | 15 | 5.5 | 11.4 | 72 | D9 |

As is evident from the results shown in Table 2B, the battery packaging materials in which the second phase particle diameter of the aluminum alloy foil was 5 μm or less had excellent moldability. Furthermore, the battery packaging materials in which the second phase particle diameter of the aluminum alloy foil was 5 μm or less, and the average grain diameter was 10 μm or less had particularly excellent moldability. In contrast, the battery packaging materials in which the second phase particle diameter of the aluminum alloy foil was over 5 μm were inferior in moldability.

Examples 1C-10C and Comparative Examples 1C-6C

<Production of Battery Packaging Materials>

Aluminum alloy foil (with a thickness as set forth in Table 1C) whose both surfaces had been subjected to a chemical conversion treatment was laminated on a base material layer formed of a biaxially stretched nylon film (thickness: 12 μm), using a dry lamination method. Specifically, a two-liquid urethane adhesive (a polyol compound and an aromatic isocyanate-based compound) was applied to one surface of each of the below-described types of aluminum alloy foil to form an adhesive agent layer (thickness: 3 μm) on the aluminum alloy foil layer. Next, the adhesive agent layer on the aluminum alloy foil layer and the base material layer were laminated together using a dry lamination method, and then subjected to an aging treatment at 40° C. for 24 hours to prepare a laminate having the base material layer/the adhesive agent layer/the aluminum alloy foil layer. The chemical conversion treatment of the aluminum foil was performed by applying a treatment solution containing a phenol resin, a chromium fluoride compound, and phosphoric acid to both surfaces of the aluminum foil using a roll coating method, such that the amount of chromium applied became 10 mg/$m^2$ (dry mass), followed by baking for 20 seconds under conditions such that the film temperature became 180° C. or higher. Next, carboxylic acid-modified polypropylene (to be disposed on the aluminum alloy foil layer) with a thickness of 14 μm and random polypropylene (to be disposed as an innermost layer) with a thickness of 10 μm were co-extruded onto the aluminum alloy foil layer of the laminate, thereby laminating an adhesive layer and a heat-sealable resin layer on the aluminum alloy foil layer. As a result, a battery packaging material was obtained in which the base material layer/the adhesive agent layer/the aluminum alloy foil layer/the adhesive layer/the heat-sealable resin layer were laminated in this order. A specific material of the aluminum alloy foil was as follows:

<Aluminum Alloy Foil>

A8021 Material: Soft Aluminum (JIS H4160 A8021H-O)

In the below-described tensile test, when the thickness of the aluminum alloy foil was set to 15 μm, the load-to-displacement relationship measured by performing the tensile test in a 45° direction with respect to the rolling direction as a reference direction (0°), in accordance with the conditions as defined in JIS Z 2241, was adjusted by changing the rolling conditions and the like during the production of the aluminum alloy foil. Specifically, aluminum alloy foil produced by changing the rolling conditions and the like in various manners was subjected to the below-described tensile test to be examined for the following conditions (1) to (3), and then the aluminum alloy foil produced under the same conditions except for the thickness was used to produce the battery packaging materials of the examples and comparative examples.

<Tensile Test for Aluminum Alloy Foil>

The same aluminum alloy foil as that used in each of the examples and comparative examples was used except that the thickness was set to 15 μm. Next, each type of aluminum alloy foil was subjected to a tensile test under the following test conditions, in accordance with the conditions as defined in JIS Z 2241: 2011. The load-to-displacement relationship ((1) to (3) shown below) is shown in Table 1C. FIGS. 4, 5, 6, and 7 illustrate graphs showing the load-to-displacement relationships for the aluminum foil used in Examples 9C, 10C, Comparative Example 1C, and Comparative Example 3C, respectively.

(Test Conditions)

A thickness of a specimen was 15 μm, a width of the specimen was 15 mm, a distance between chucks was 100 mm, and a tensile speed was 20 mm/min, wherein a tensile direction was a 45° direction with respect to a rolling direction of the aluminum alloy foil as a reference direction (0°).

(1): A load N required for displacement to reach 15 mm from 0 mm (when a rupture occurred before the displacement reached 15 mm, the straight line of the graph was extended to estimate the load N based on the assumption that the displacement reached 15 mm.)

(2): Displacement (mm) at which a rupture occurred (3): An increase in the load (N) until displacement reached 5 mm from 1 mm (Evaluation of Moldability)

Each of the battery packaging materials obtained as described above was cut into a rectangle of 80×120 mm to prepare a sample. Using a molding die (die) having a diameter of 30×50 mm and a corresponding molding die (punch), the sample was cold-formed while changing the molding depth in 0.5 mm increments from a molding depth of 0.5 mm, under a pressing force of 0.4 MPa. The cold forming was performed for 10 samples at each depth. For the samples after the cold forming, the deepest molding depth at which all the 10 samples of the battery packaging material did not develop pinholes or cracks was defined as the limit molding depth of the samples. The moldability of the battery packaging material was evaluated based on this limit molding depth, using the same criteria as those for Examples 1A-22A and Comparative Examples 1A-14A above. The results are shown in Table 1C.

TABLE 1C

| | Aluminum Alloy Foil | | | | |
|---|---|---|---|---|---|
| | Thickness (μm) | Load Required for Displacement to Reach 15 mm from 0 mm (N) | Displacement (mm) at Which Rupture Occurred (mm) | Increase in Load (N) until Displacement Reached 5 mm from 1 mm (N) | Moldability Evaluation |
| Example 1C | 100 | 18.3 | 17.0 | 0.2 | A1 |
| Example 2C | 80 | 16.5 | 16.5 | 0.1 | A2 |
| Example 3C | 50 | 16.9 | 17.2 | 0.1 | A3 |

TABLE 1C-continued

| | Aluminum Alloy Foil | | | | |
|---|---|---|---|---|---|
| | Thickness (μm) | Load Required for Displacement to Reach 15 mm from 0 mm (N) | Displacement (mm) at Which Rupture Occurred (mm) | Increase in Load (N) until Displacement Reached 5 mm from 1 mm (N) | Moldability Evaluation |
| Example 4C | 40 | 17.0 | 17.6 | 0.2 | A4 |
| Example 5C | 35 | 17.4 | 16.9 | 0.1 | A5 |
| Example 6C | 30 | 17.0 | 16.3 | 0.1 | A6 |
| Example 7C | 25 | 16.4 | 17.8 | 0.3 | A7 |
| Example 8C | 20 | 18.0 | 16.6 | 0.2 | A8 |
| Example 9C | 15 | 18.5 | 17.9 | 0.1 | A9 |
| Example 10C | 15 | 16.5 | 16.5 | 3.5 | B9 |
| Comparative Example 1C | 15 | 16.5 | 14.0 | 0.2 | C9 |
| Comparative Example 2C | 15 | 16.7 | 13.0 | 3.3 | D9 |
| Comparative Example 3C | 15 | 14.5 | 18.0 | 0.2 | C9 |
| Comparative Example 4C | 15 | 14.0 | 17.5 | 3.4 | D9 |
| Comparative Example 5C | 15 | 13.8 | 14.5 | 0.3 | D9 |
| Comparative Example 6C | 15 | 12.0 | 13.4 | 3.5 | D9 |

As is evident from the results shown in Table 1C, moldability was excellent in the case of the battery packaging materials of Examples 1C to 10C in which, when the thickness of the aluminum alloy foil was 15 μm, the load-to-displacement relationship measured by performing the tensile test under the above-described test conditions in accordance with the conditions as defined in JIS Z 2241: 2011 satisfied the following conditions: (1) the load required for the displacement to reach 15 mm from 0 mm was 15.0 N or more; and (2) the displacement at which a rupture occurred was 15 mm or more.

REFERENCE SIGNS LIST

1: base material layer
2: adhesive agent layer
3: aluminum alloy foil layer
4: heat-sealable resin layer
5: adhesive layer
31: grain
32: second phase particle

The invention claimed is:

1. A battery packaging material comprising:
an aluminum alloy foil layer that consists of an aluminum alloy selected from the group consisting of the aluminum alloys specified in JIS H4160 A8021H-O, JIS H4160 A8079H-O, JIS H4000: 2014 A8021P-O, and JIS H4000: 2014 A8079P-O; and
an acid resistance film formed on at least one surface of the aluminum alloy foil layer,
wherein:
the acid resistance film has a multilayer structure comprising:
a first layer including:
a cerium oxide,
one of a phosphoric acid or a phosphate,
an anionic polymer, and
a crosslinking agent for crosslinking the anionic polymer, and
a second layer including;
a cationic polymer, and
a crosslinking agent for crosslinking the cationic polymer, and
a thickness of the aluminum alloy foil layer is from 15 μm to 35 μm,
for any 100 aluminum alloy grains positioned within a field of view of a scanning electron microscope in a cross section of the aluminum alloy foil layer in a thickness direction, an average grain diameter, which is an average value of a maximum diameter x of the 100 aluminum alloy grains, is from 1.0 μm to 7.0 μm, where the maximum diameter x is defined as a linear distance connecting a leftmost end of each of the 100 aluminum alloy grains in a direction perpendicular to the thickness direction and a rightmost end of the grain in the direction perpendicular to the thickness direction,
for any 100 second phase particles within a field of view of an optical microscope in a cross section of the aluminum alloy foil layer in the thickness direction, an average value of a diameter y of top 20 second phase particles in decreasing order of the diameter y is from 1.0 μm to 4.0 μm, where the diameter y is defined as a linear distance connecting a leftmost end of each of the top 20 second phase particles in the direction perpendicular to the thickness direction and a rightmost end of the second phase particle in the direction perpendicular to the thickness direction, and
a moldability of the battery packaging material, as defined by a maximum molding depth at which the battery packaging material does not develop pinholes or cracks when subject to cold forming under a pressing force of 0.4 MPa, is:
5.5 mm or more, when the thickness of the aluminum alloy foil layer is 15 μm or more and less than 20 μm,
6.0 mm or more, when the thickness of the aluminum alloy foil layer is 20 μm or more and less than 25 μm,
6.5 mm or more, when the thickness of the aluminum alloy foil layer 25 μm or more and less than 30 μm,
2.0 mm or more, when the thickness of the aluminum alloy foil layer is 30 μm or more and less than 35 μm, and
8.0 mm or more, when the thickness of the aluminum alloy foil layer is 35 μm.

2. The battery packaging material according to claim 1, wherein an aluminum alloy constituting the aluminum alloy foil layer comprises
0.7 mass % or more and 2.5 mass % or less of Fe,
0.05 mass % or less of Cu, and
0.30 mass % or less of Si.

3. The battery packaging material according to claim 1, which is a packaging material for secondary batteries.

4. A battery comprising a battery element comprising at least a positive electrode, a negative electrode, and an electrolyte, the battery element being housed in a container formed of the battery packaging material according to claim 1.

5. Aluminum alloy foil for use in a battery packaging material, the aluminum alloy foil comprising:

an aluminum alloy foil layer that consists of an aluminum alloy selected from the group consisting of the aluminum alloys specified in JIS H4160 A8021H-O, JIS H4160 A8079H-O, JIS H4000: 2014 A8021P-O, and JIS H4000: 2014 A8079P-O; and an acid resistance film formed on at least one surface of the aluminum alloy foil layer, wherein:

the acid resistance film has a multilayer structure comprising:

a first layer including:

a cerium oxide, one of a phosphoric acid or a phosphate, an anionic polymer, and a crosslinking agent for crosslinking the anionic polymer, and a second layer including:

a cationic polymer, and a crosslinking agent for crosslinking the cationic polymer, and a thickness of the aluminum alloy foil layer is from 15 μm to 35 μm, for any 100 aluminum alloy grains positioned within a field of view of a scanning electron microscope in a cross section of the aluminum alloy foil in a thickness direction, an average grain diameter, which is an average value of a maximum diameter x of the 100 aluminum alloy grains, is from 1.0 μm to 7.0 μm, where the maximum diameter x is defined as a linear distance connecting a leftmost end of each of the 100 aluminum alloy grains in a direction perpendicular to the thickness direction and a rightmost end of the grain in the direction perpendicular to the thickness direction, for any 100 second phase particles within a field of view of an optical microscope in a cross section of the aluminum alloy foil in the thickness direction, an average value of a diameter y of top 20 second phase particles in decreasing order of the diameter y is from 1.0 μm to 4.0 μm, where the diameter y is defined as a linear distance connecting a leftmost end of each of the top 20 second phase particles in the direction perpendicular to the thickness direction and a rightmost end of the second phase particle in the direction perpendicular to the thickness direction, and a moldability of the aluminum alloy foil layer, as defined by a maximum molding depth of a battery packaging material comprising the aluminum alloy foil layer at which the battery packaging material does not develop pinholes or cracks when subject to cold forming under a pressing force of 0.4 MPa, is:

5.5 mm or more, when the thickness of the aluminum alloy foil layer is 15 μm or more and less than 20 μm, 6.0 mm or more, when the thickness of the aluminum alloy foil layer is 20 μm or more and less than 25 μm, 6.5 mm or more, when the thickness of the aluminum alloy foil layer 25 μm or more and less than 30 μm, 2.0 mm or more, when the thickness of the aluminum alloy foil layer is 30 μm or more and less than 35 μm, and 8.0 mm or more, when the thickness of the aluminum alloy foil layer is 35 μm.

6. The battery packaging material according to claim 1, wherein the thickness of the aluminum alloy foil layer is from 15 μm to 30 μm.

7. The battery packaging material according to claim 1, wherein the thickness of the aluminum alloy foil layer is from 15 μm to 25 μm.

8. The battery packaging material according to claim 1, wherein a thickness of the battery packaging material is from 40 μm to 90 μm.

9. The aluminum alloy foil for use in a battery packaging material according to claim 5, wherein the thickness of the aluminum alloy foil is from 15 μm to 25 μm.

10. The aluminum alloy foil for use in a battery packaging material according to claim 5, wherein a thickness of the battery packaging material is from 40 μm to 90 μm.

11. The battery packaging material according to claim 1, wherein the acid resistance film comprises a chromium fluoride compound.

12. The battery packaging material according to claim 1, wherein the acid resistance film comprises a chromium fluoride compound and phosphoric acid.

13. The battery packaging material according to claim 1, wherein the acid resistance film comprises a chromium fluoride compound, phosphoric acid, and a phenol resin.

14. The aluminum alloy foil for use in a battery packaging material according to claim 5, wherein the acid resistance film comprises a chromium fluoride compound.

15. The aluminum alloy foil for use in a battery packaging material according to claim 5, wherein the acid resistance film comprises a chromium fluoride compound and phosphoric acid.

16. The aluminum alloy foil for use in a battery packaging material according to claim 5, wherein the acid resistance film comprises a chromium fluoride compound, phosphoric acid, and a phenol resin.

* * * * *